May 27, 1952

T. A. FEDERWITZ 2,598,523

DATA WRITING MACHINE

Filed Oct. 5, 1948

WITNESSES

INVENTOR:
Theodore A. Federwitz,
BY Paul & Paul
ATTORNEYS.

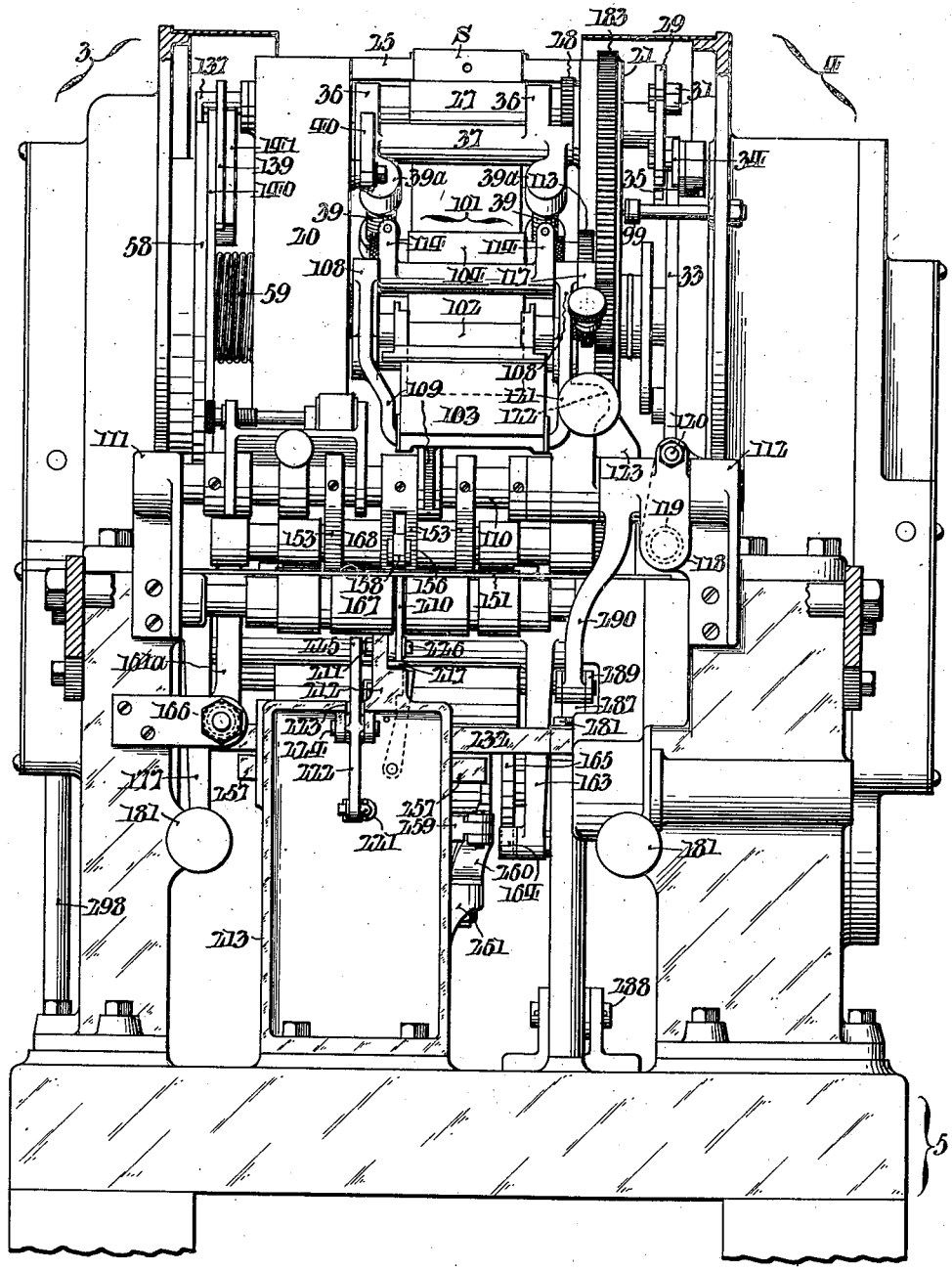

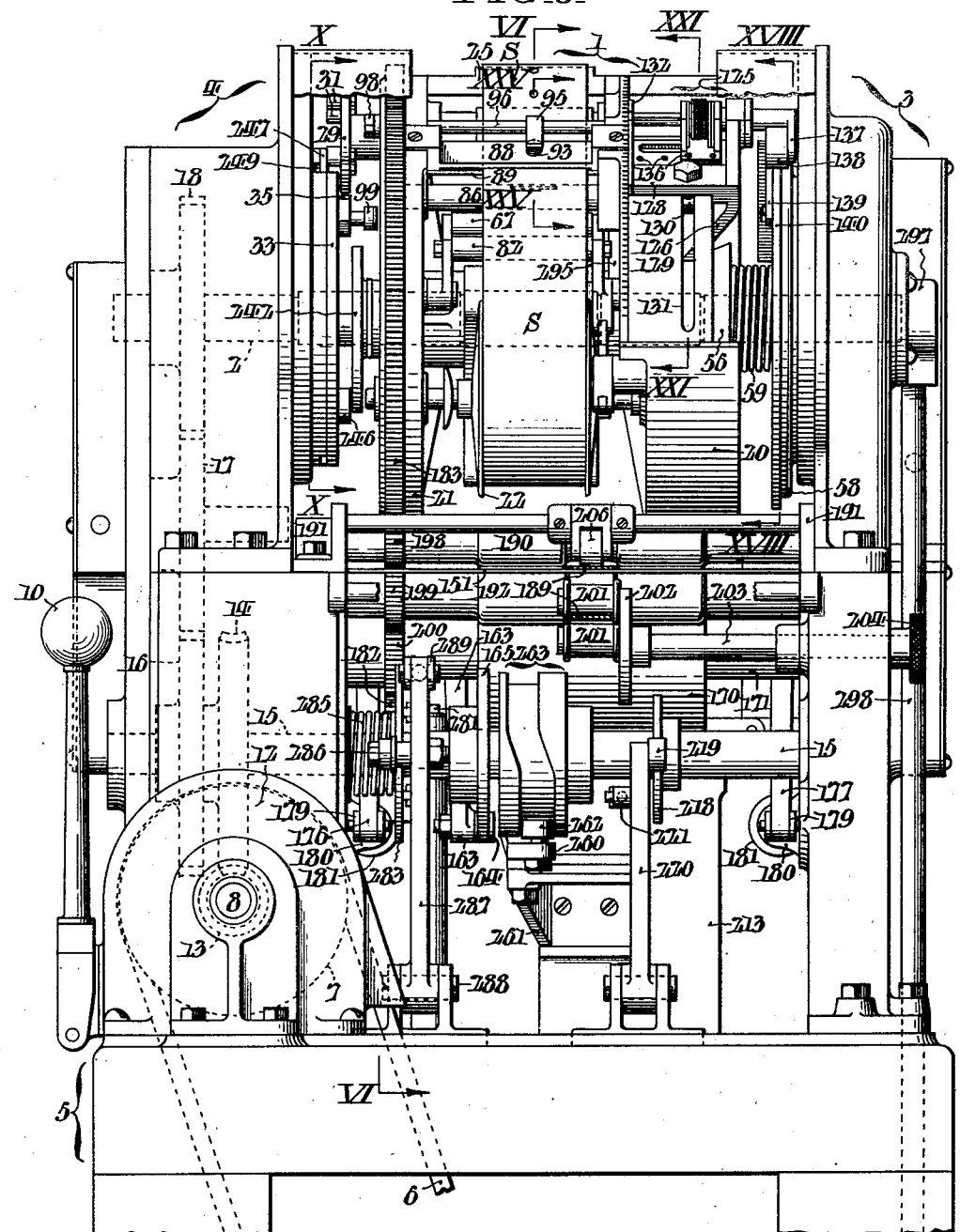

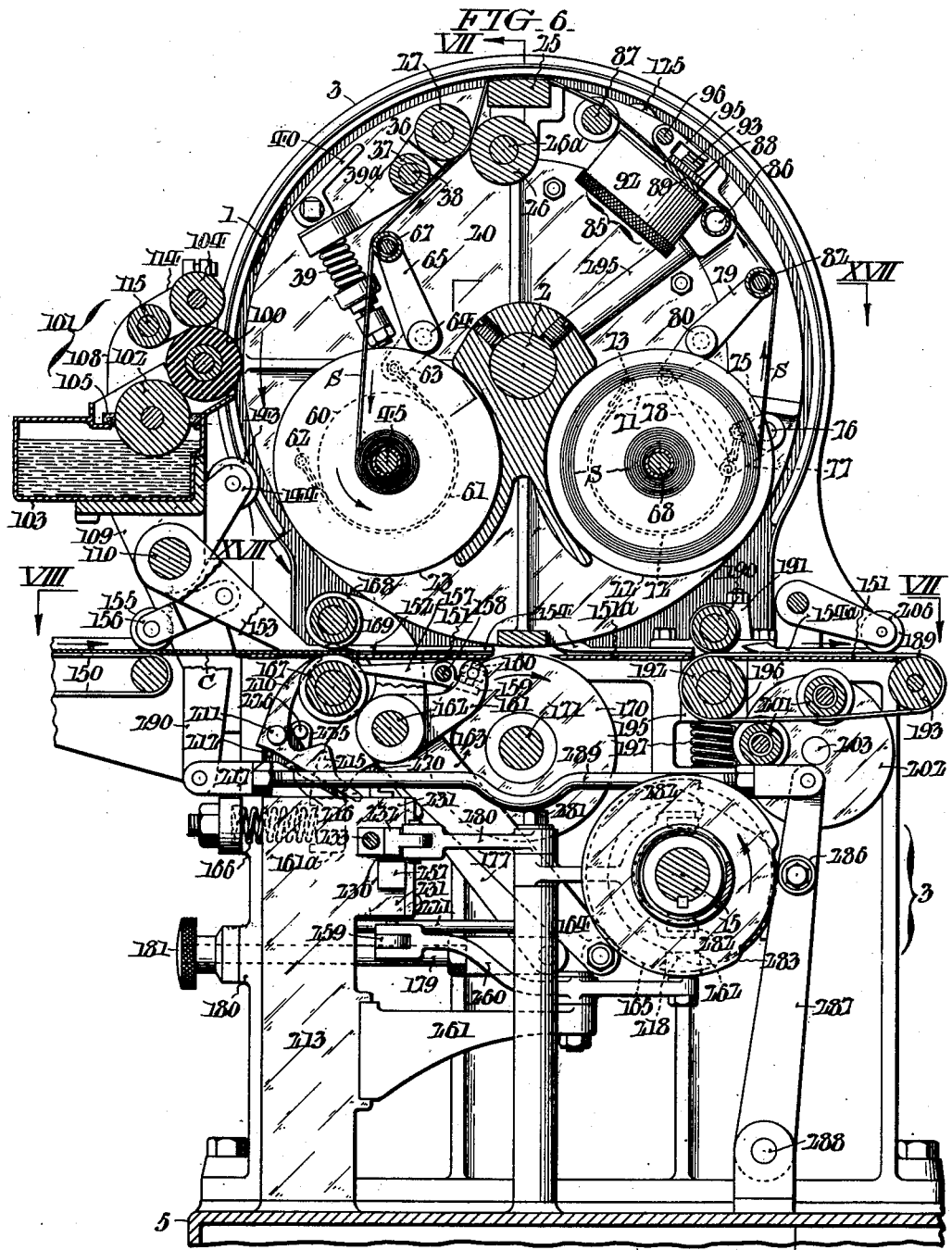

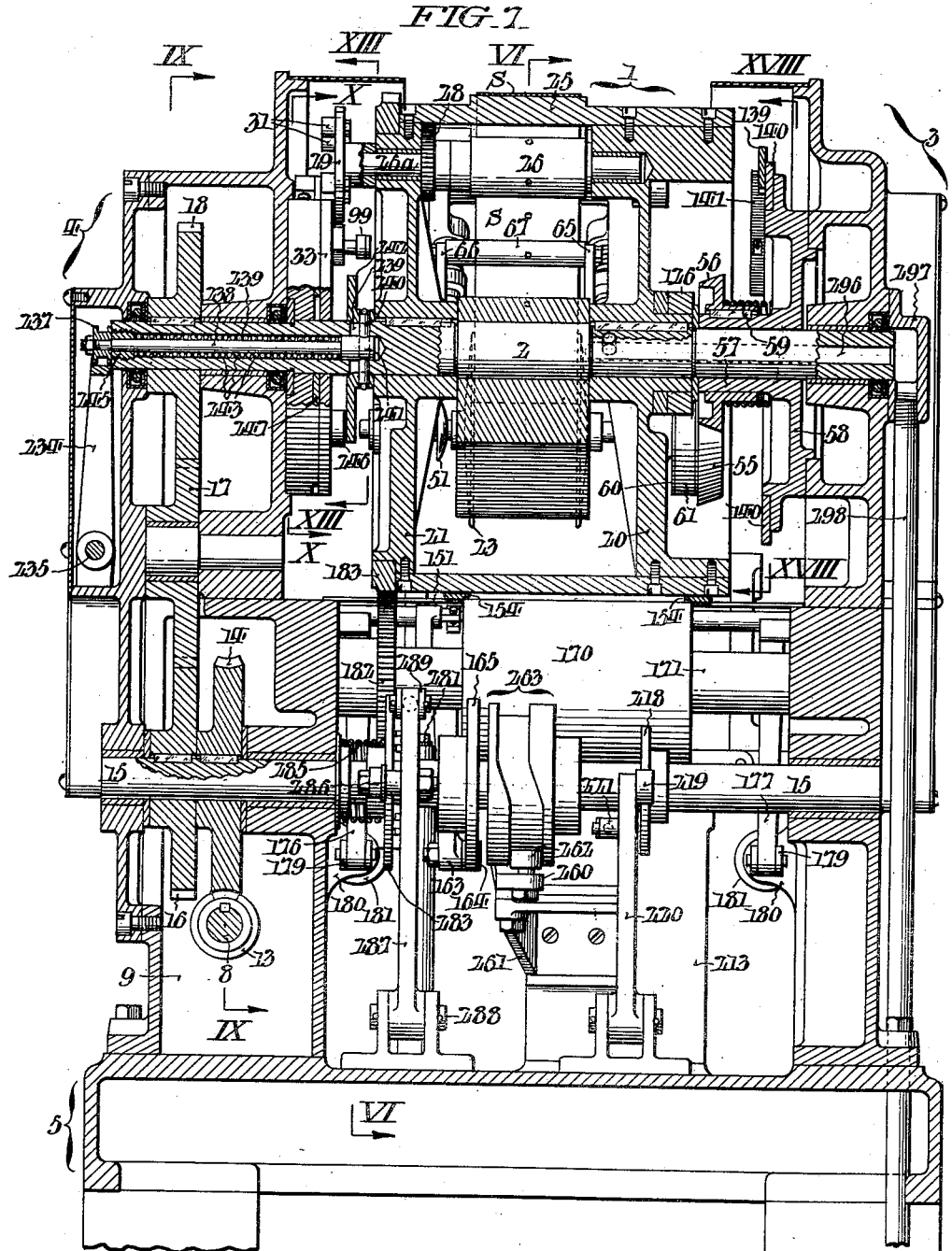

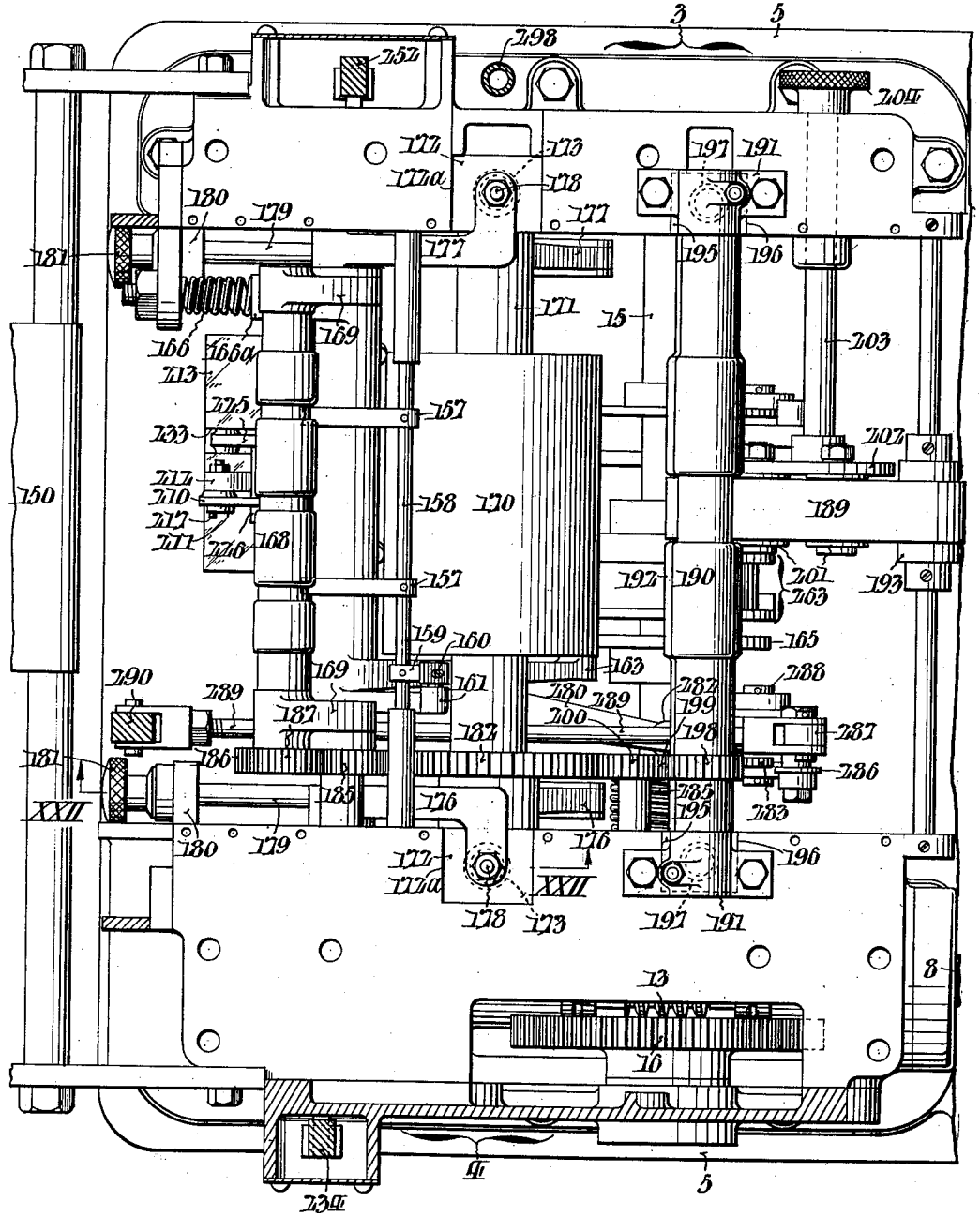

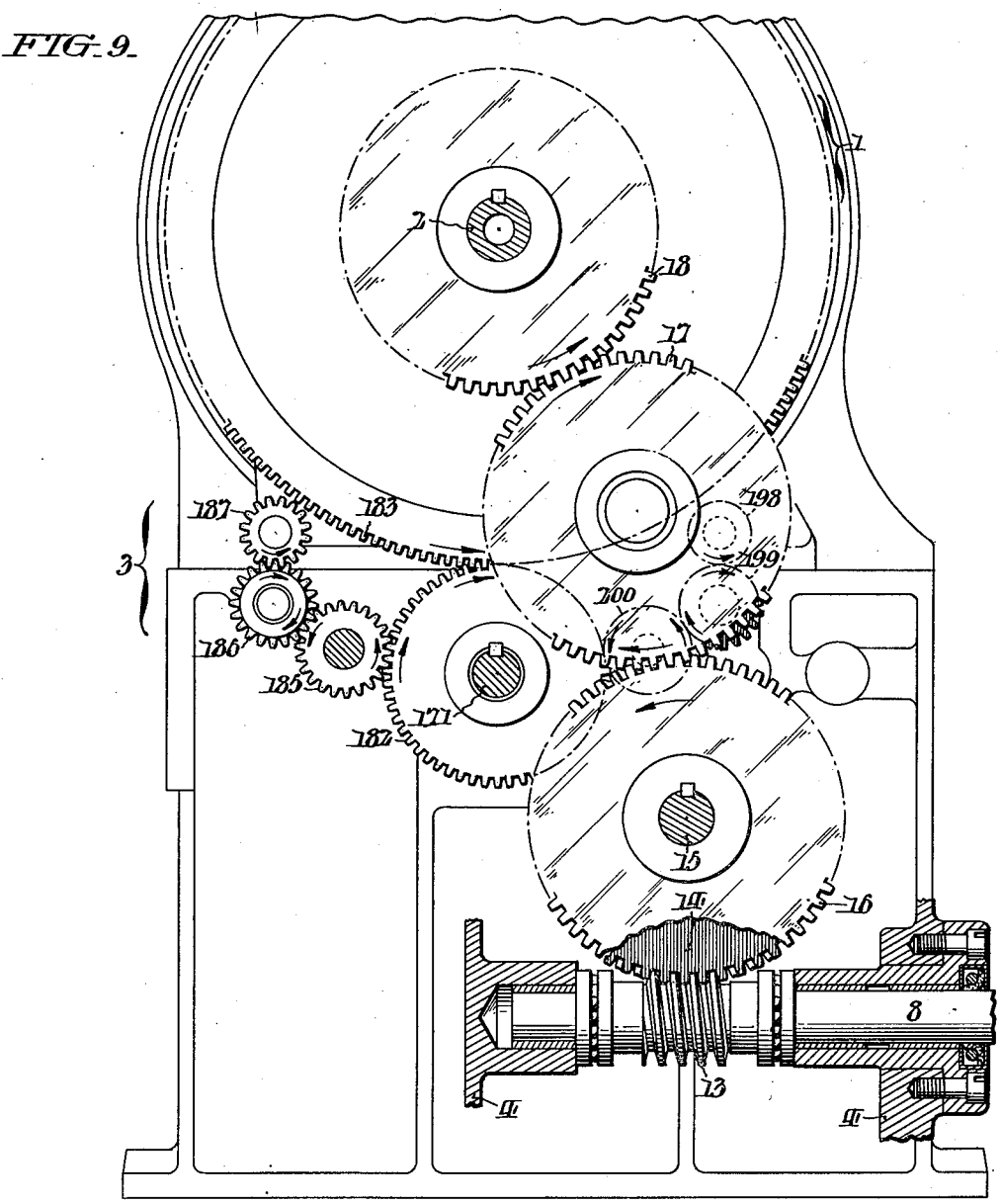

May 27, 1952 T. A. FEDERWITZ 2,598,523
DATA WRITING MACHINE
Filed Oct. 5, 1948 17 Sheets-Sheet 10

WITNESSES
INVENTOR:
Theodore A. Federwitz,
BY Paul & Paul
ATTORNEYS.

May 27, 1952     T. A. FEDERWITZ     2,598,523
DATA WRITING MACHINE
Filed Oct. 5, 1948     17 Sheets-Sheet 11
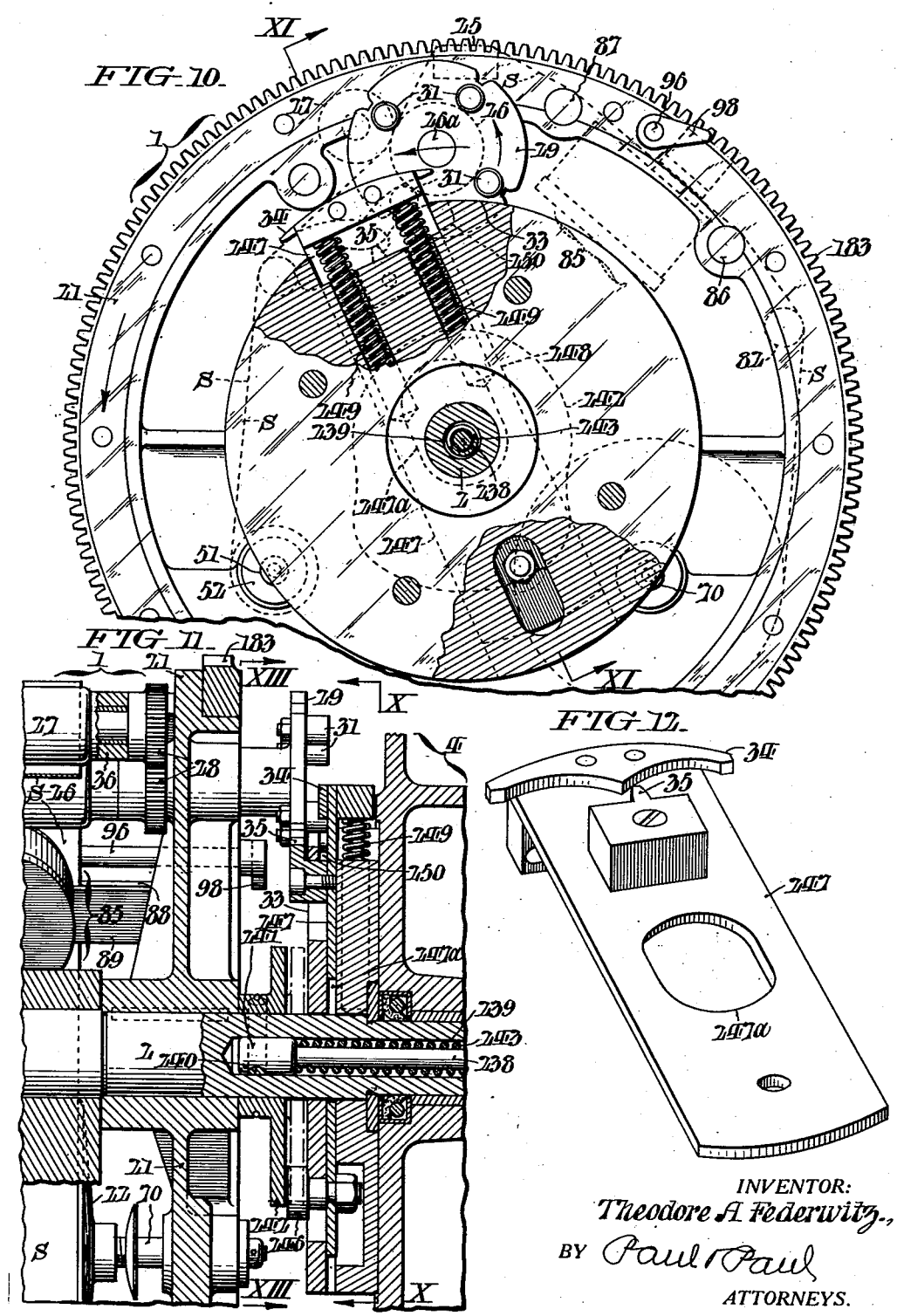
INVENTOR:
Theodore A. Federwitz,
BY Paul & Paul
ATTORNEYS.

May 27, 1952     T. A. FEDERWITZ     2,598,523
DATA WRITING MACHINE
Filed Oct. 5, 1948     17 Sheets-Sheet 12
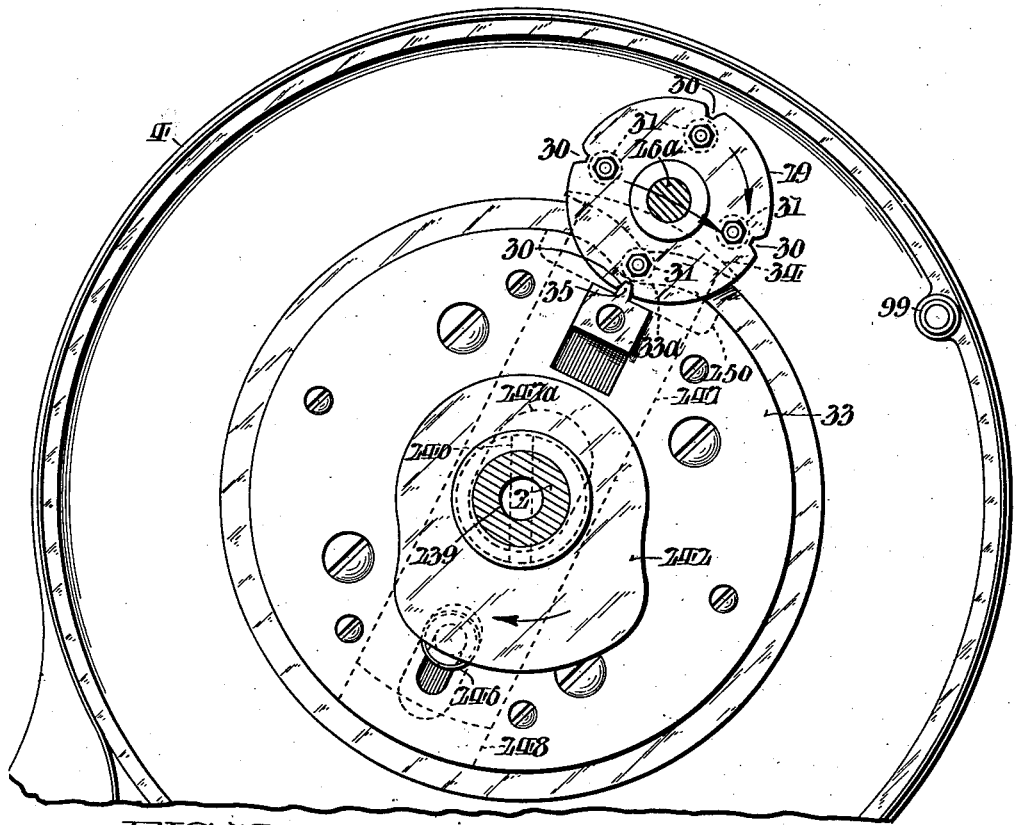
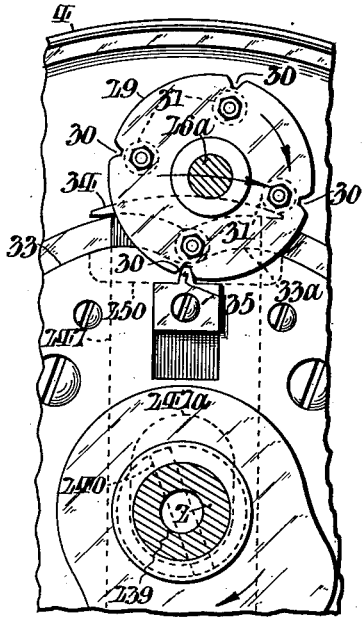
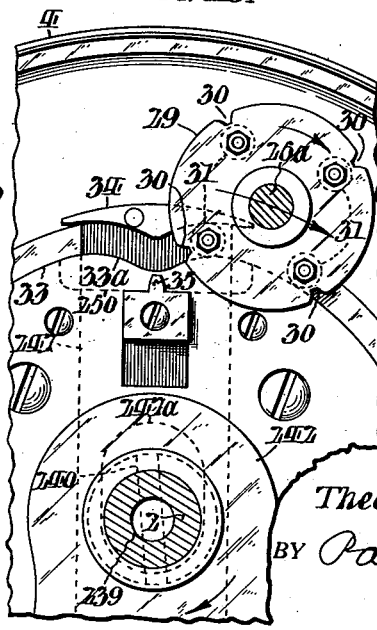
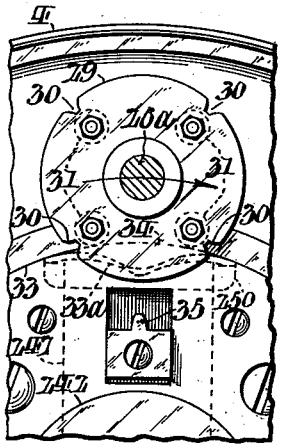
INVENTOR:
Theodore A. Federwitz,
BY Paul & Paul
ATTORNEYS.

May 27, 1952 — T. A. FEDERWITZ — 2,598,523
DATA WRITING MACHINE
Filed Oct. 5, 1948 — 17 Sheets-Sheet 13
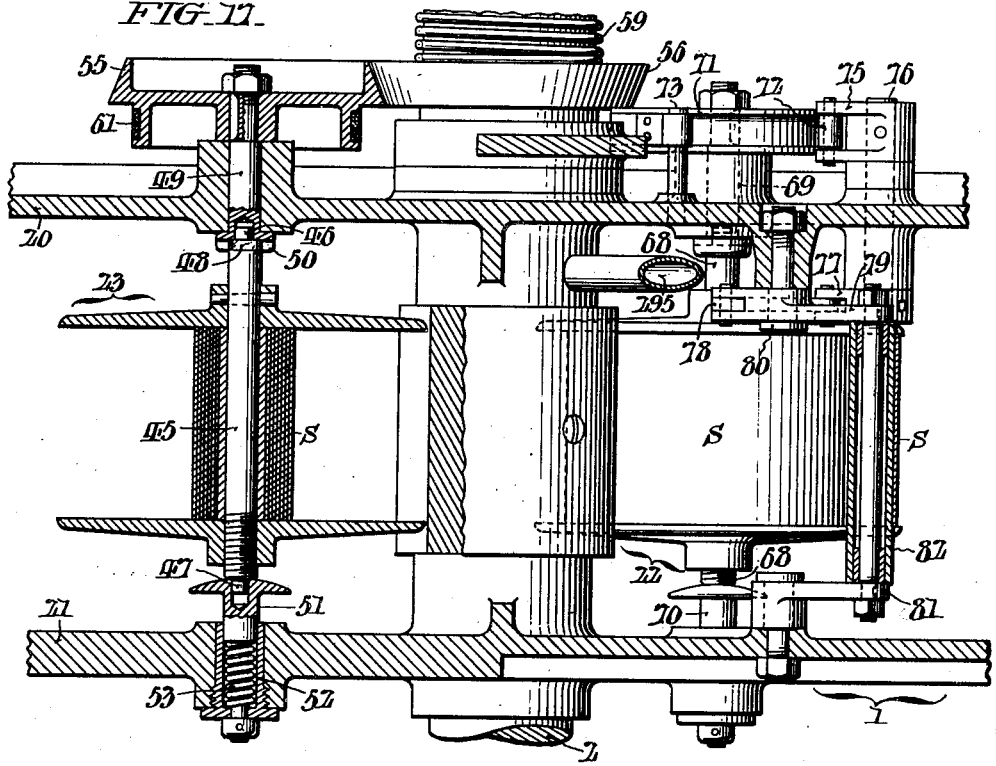
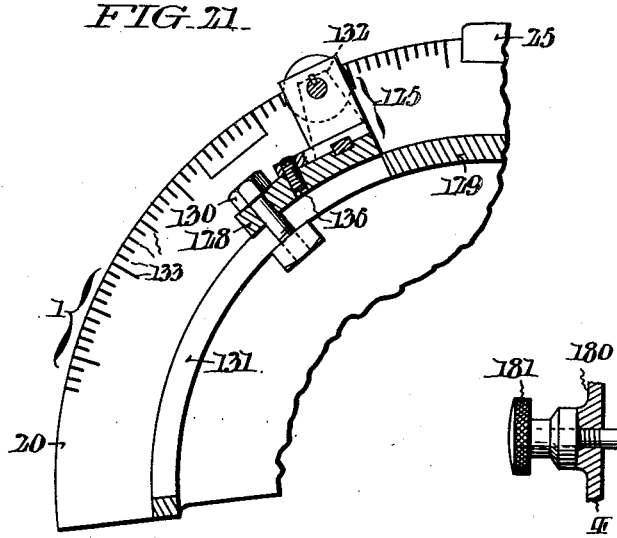
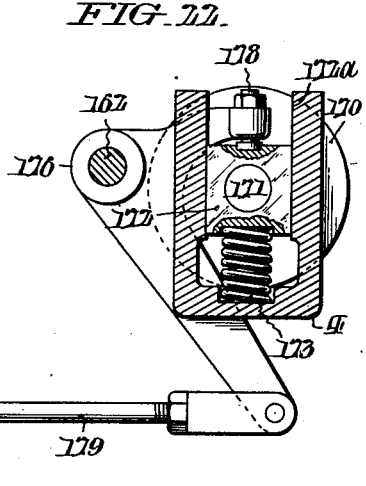
WITNESSES
INVENTOR:
Theodore A. Federwitz,
BY
ATTORNEYS.

May 27, 1952     T. A. FEDERWITZ     2,598,523
DATA WRITING MACHINE
Filed Oct. 5, 1948     17 Sheets-Sheet 14
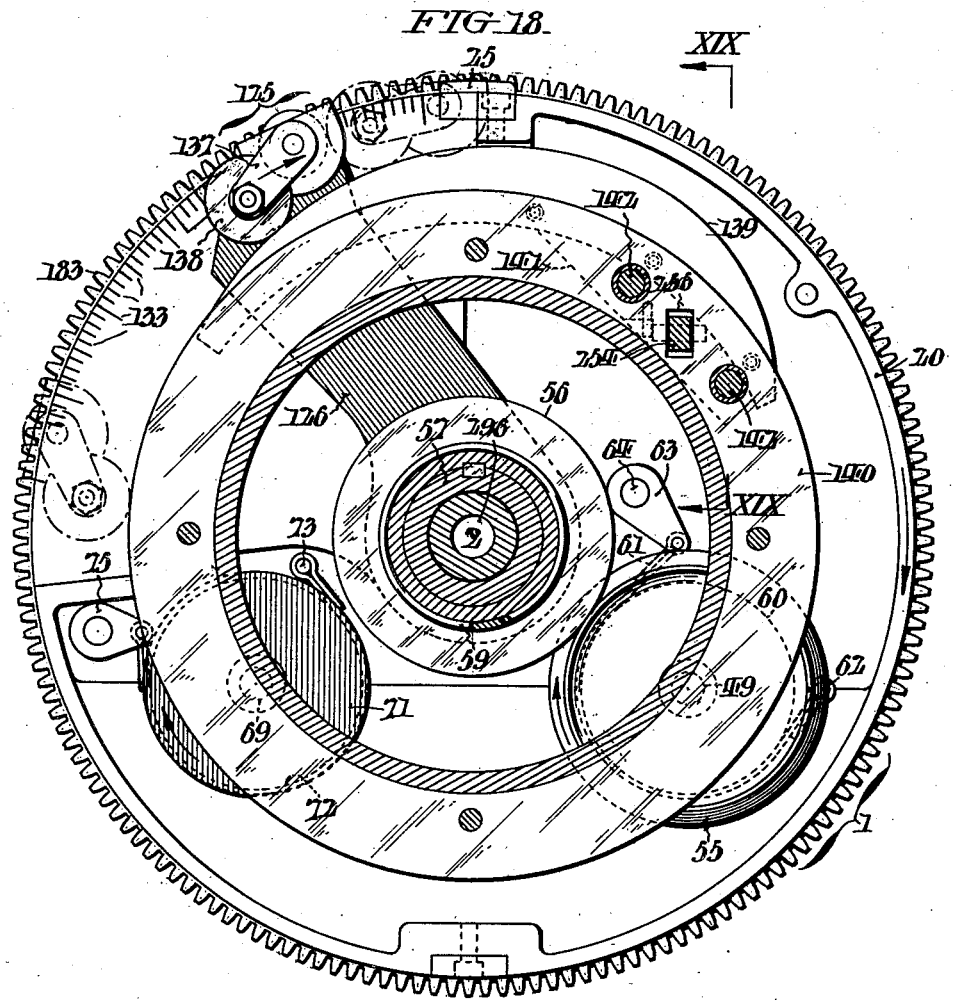
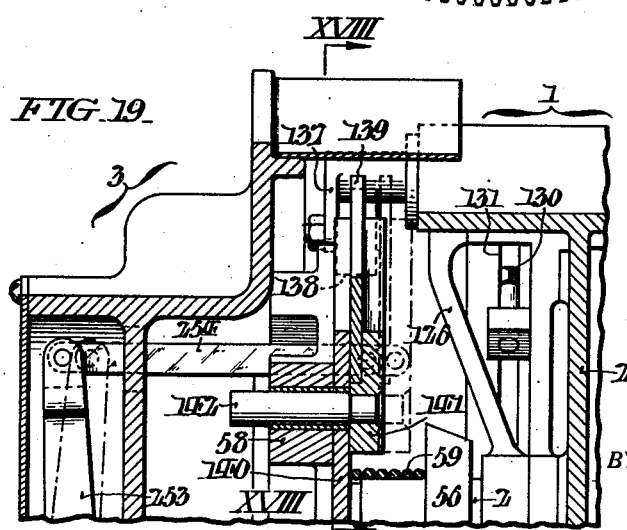
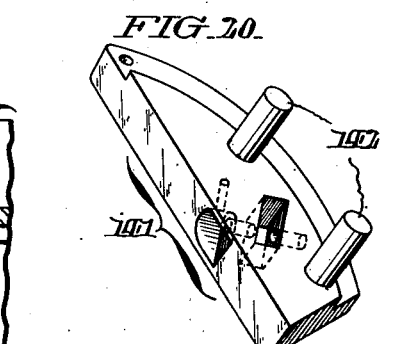
INVENTOR:
Theodore A. Federwitz,
BY Paul & Paul
ATTORNEYS.

May 27, 1952     T. A. FEDERWITZ     2,598,523
DATA WRITING MACHINE
Filed Oct. 5, 1948     17 Sheets—Sheet 15
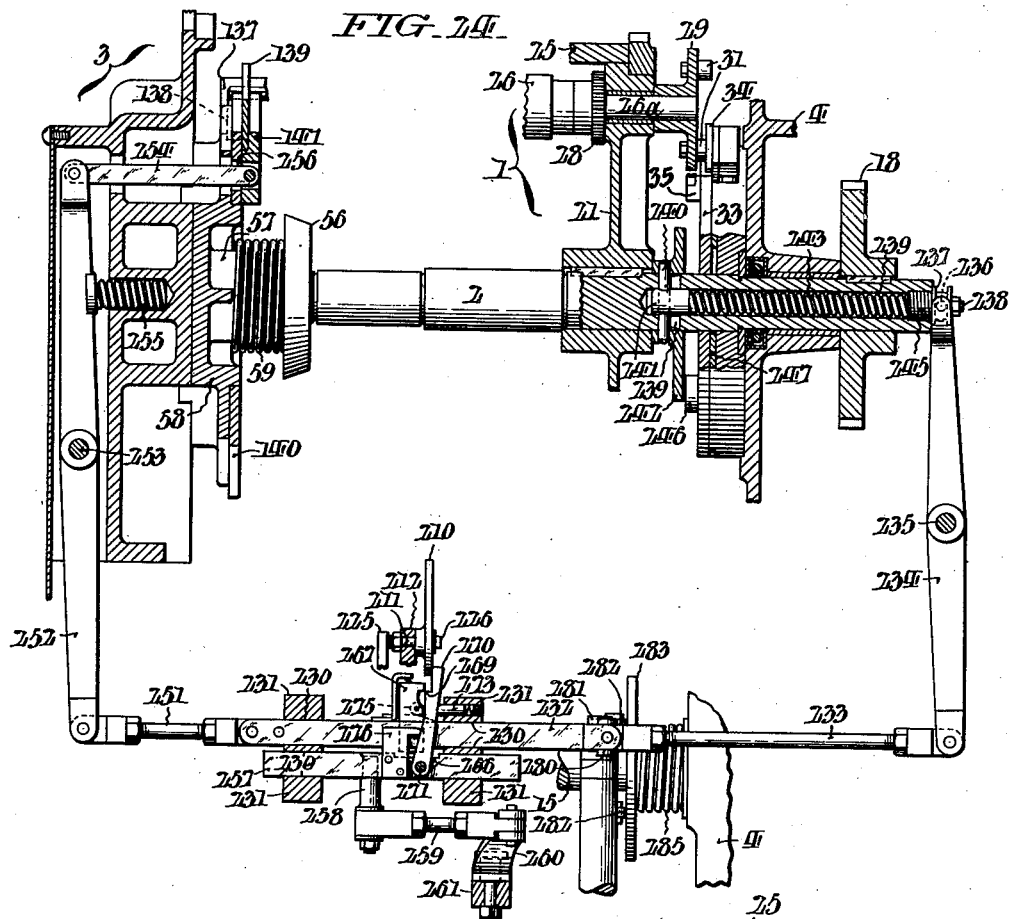
INVENTOR:
Theodore A. Federwitz,
BY Paul & Paul
ATTORNEYS.

May 27, 1952 T. A. FEDERWITZ 2,598,523
DATA WRITING MACHINE
Filed Oct. 5, 1948 17 Sheets-Sheet 16
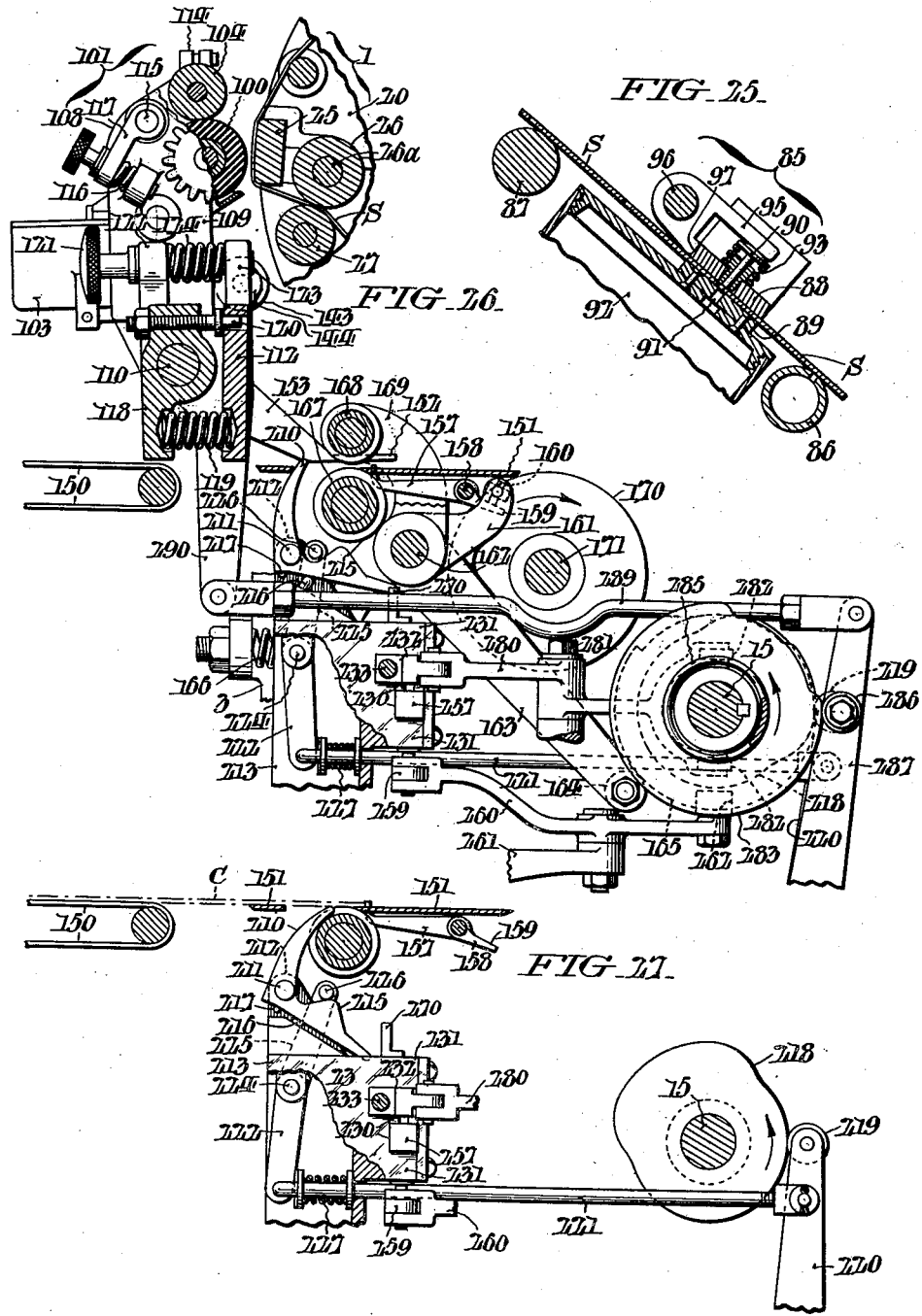

May 27, 1952     T. A. FEDERWITZ     2,598,523
DATA WRITING MACHINE
Filed Oct. 5, 1948     17 Sheets-Sheet 17

INVENTOR:
Theodore A. Federwitz,
BY Paul & Paul
ATTORNEYS.

Patented May 27, 1952

2,598,523

UNITED STATES PATENT OFFICE 2,598,523

DATA WRITING MACHINE

Theodore A. Federwitz, Philadelphia, Pa., assignor, by mesne assignments, to Scriptomatic, Inc., Philadelphia, Pa., a corporation of Pennsylvania Application October 5, 1948, Serial No. 52,932

17 Claims. (Cl. 101—47)

This invention relates to data writing machines. More specifically, it is concerned with data writing machines of the type disclosed in a co-pending patent application Serial No. 672,526 filed by Robert J. Crissy on May 27, 1946 (now abandoned), designed for transfer of typed or otherwise inscribed data upon master sheets or cards with copying ink, to successive areas of a continuous strip of paper or the like intermittently advanced over a segmental platen surface on a press element or rotor, enroute from a supply reel to a take-up reel also carried by said rotor. During each actuation or revolution of the rotor, the successively opposed areas of the strip on the platen surface are wetted by contact with a moisture applying means before being brought into pressure contact with the master data sheets or cards successively fed into and advanced through the machine, to receive imprints of the data from said sheets or cards, with incidental perforation of the strip at regular intervals by a punching device on the rotor.

One of the aims of my invention is to provide in a data writing machine characterized as above, means for serially numbering and at the same time counting the master sheets or cards as they are successively passed through the machine, capable of adjustment both circumferentially and transversely of the rotor so that the numbering may be applied at any desired location on said master sheets or cards.

Another object of my invention is to provide improved means for intermittently advancing the strip and maintaining it at uniform tension as it passes over the platen surface of the rotor enroute from the supply reel to the take-up reel.

Still another object of my invention is to provide control mechanism whereby, in the absence of a data sheet or card in the machine at any time, the strip feeding means and the numbering and counting means are automatically rendered inoperative, with concurrent withdrawal of the moistening means of the machine to a retracted position to avoid wiping of the exposed area of the strip then arrested on the platen surface of the rotor.

A further aim of my invention is to provide means automatically operative to prevent feeding of cards into the machine in the event of rupture of the strip.

Other objects and attendant advantages will appear from the following detailed description of the attached drawings, wherein—

Fig. 4 shows the elevation of the front or receiving end of the machine.

Fig. 5 shows the elevation of the rear or delivery end of the machine.

Fig. 6 is a longitudinal section of the machine taken as indicated by the angled arrows VI—VI in Figs. 5 and 7.

Fig. 7 is a transverse section taken as indicated by the angled arrows VII—VII in Figs. 2, 3 and 6.

Fig. 8 is a horizontal section taken as indicated by the angled arrows VIII—VIII in Fig. 6.

Fig. 9 is a vertical section taken as indicated by the angled arrows IX—IX in Fig. 7.

Fig. 10 is a fragmentary view in vertical section taken as indicated by the angled arrows X—X in Figs. 5, 7 and 11.

Fig. 11 is a fragmentary sectional view taken as indicated by the angled arrows XI—XI in Fig. 10.

Fig. 12 is a perspective view of one of the elements of the machine shown in Figs. 10 and 11.

Fig. 13 is a fragmentary sectional view taken as indicated by the angled arrows XIII—XIII in Figs. 7 and 11.

Figs. 14–16 are views like Fig. 13 with various parts differently positioned.

Fig. 17 is a fragmentary horizontal section taken as indicated by the angled arrows XVII—XVII in Fig. 6.

Fig. 18 is a vertical section taken as indicated by the angled arrows XVIII—XVIII in Figs. 5, 7 and 19.

Fig. 19 is a fragmentary sectional view taken as indicated by the angled arrows XIX—XIX in Fig. 18.

Fig. 20 is a perspective view of one of the elements of the machine shown in Figs. 17 and 18.

Fig. 21 is a fragmentary detail sectional view taken as indicated by the angled arrows XXI—XXI in Fig. 5, and showing a scale arrangement for facilitating the adjustment of the number printing means circumferentially of the rotor.

Fig. 22 is a detailed section taken as indicated by the angled arrows XXII—XXII in Fig. 8.

Fig. 23 is a fragmentary vertical sectional view like Fig. 6 with certain of the parts differently positioned.

Fig. 24 is a fragmentary view in staggered transverse section taken as indicated by the angled arrows XXIV—XXIV in Fig. 6, showing more particularly the control mechanism by which actuation of the strip feeding means and the number printing and counting means is prevented in the absence of a data sheet or card in the machine.

Fig. 25 is a fragmentary detail view in section, taken as indicated by the angled arrows XXV—XXV in Figs. 1 and 5 showing the tape punching means.

Figs. 26 and 27 are fragmentary views in longitudinal section corresponding to Fig. 6 showing the control means in different operative phases.

Fig. 30 shows a portion of the strip after transfer thereto of data from several of the master sheets or cards.

Figure 1:
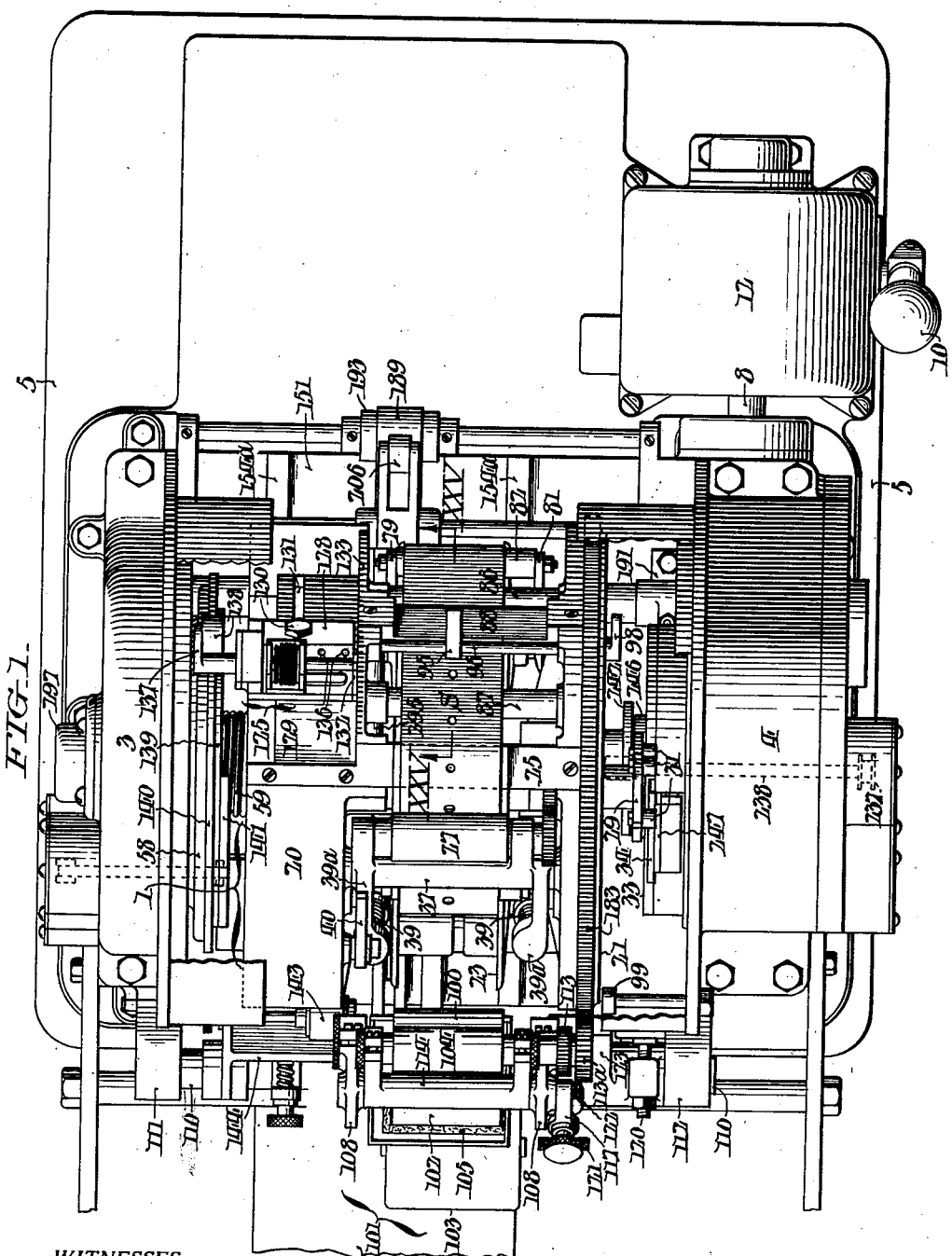
Fig. 1 is a view, in top plan, of a data writing machine conveniently embodying my invention.

As herein illustrated, my improved data writing machine comprises a press element or rotor 1 whereof the shaft 2 is supported at its opposite ends in bearings afforded by frames 3 and 4 upstanding from opposite sides of a base 5. The machine is arranged to be driven from an electric motor or other prime mover (not shown) by a belt 6 trained about a pulley 7 on a longitudinal shaft 8 which extends into a hollow 9 in the side frame 4. The machine is manually controllable by means of a hand lever 10 for shifting a splined clutch collar 11 on shaft 8 within a housing 12 into or out of engagement with the pulley 7. Keyed to the shaft 8 within the hollow 9 of a frame 4 is a worm 13 which meshes with a worm wheel 14 affixed to a transverse main or transmission shaft 15. Through a train of spur gears 16, 17 and 18, also within the hollow 9 of side frame 4, rotary motion is communicated from the transmission shaft 15 to the rotor 1.

Mounted with capacity for independent rotation in the interval between and within the confines of the two laterally-spaced circular discous side members or heads 20 and 21 (Fig. 7) of the rotor 1 are supply and take-up spools or reels 22 and 23 for a continuous strip S of paper or the like to which data is to be transferred from master sheets or cards C. In passing from the supply spool 22 to the take-up spool 23, the strip S overtravels the segmental outer face of a platen bar 25 bridged between the heads 20 and 21 of the rotor 1 at their peripheries. The strip S is intermittently progressed by a pair of nip rolls 26, 27 which are intergeared as at 28 in Figs. 7 and 11, and which are also carried by the rotor 1. One end of the shaft 26a of the the roll 26 extends through the rotor head 21, and secured thereto is a disk 29 (Figs. 6, 7, 10, 11, 13–16) with four equally spaced circumferential notches 30, and with a corresponding member of laterally projecting studs 31 in radially aligned relation to said notches. During each revolution of the rotor 1 in the direction of the arrows respectively in Figs. 10, 13–16, a quarter turn is imparted to the roll 26 as one of the studs 31 on the disk 29 traverses a groove between a circumferential cam depression 33a in a fixed annular plate 33 at the inner face of the side frame 4, and a complementally configured cam piece 34 normally overlying said depression, with the result that the strip S is progressed by a corresponding amount for presentation each time a fresh area thereof at the platen surface of the bar 25. Positive rotation of the roll 26 is insured through successive engagement of the notches 30 of the disk 29 by a tooth 35 normally disposed in the path thereof. After the roll 26 is actuated in the manner just explained it is held against turning during the completion of an instant revolution of the rotor as a pair of the studs 31 ride the edge of the plate 33. From Fig. 23 it will be noted that the ends of the shaft of roll 27 are journalled in the arms 36 of a sleeve 37 which is rockable about a rod 38 extending between the rotor heads 20 and 21. Compression springs 39, acting on the tail ends 39a of the arms 36 of sleeve 37, serve to maintain the roll 27 yieldingly engaged with the mating roll 26. In order to facilitate threading of the strip S in the machine initially, the roll 27 is retractable by means of a cam lever 40 which, when swung through a quadrant from the position of Fig. 6 to the position of Fig. 23, reacts upon the tail end 39a of one of the arms 36 of sleeve 37 to turn the latter and thereby move said roll away from the roll 27 by a sufficient distance for the stated purpose.

As shown in Fig. 17, the spindle 45 of the take-up spool 23 has short trunnions 46 and 47, and is flattened, as at 48, adjacent the trunnion 46 which latter engages an axial socket at the inner end of a short shaft 49 rotative in the rotor head 20. The flattened portion 48 of the spindle 45 fits into a diametrical slot in the terminal enlargement 50 of the shaft 49 for positive coupling of the take-up spool to said shaft. The trunnion 47 of spindle 45 similarly engages an axial socket in a flanged cylindric bearing element 51 which is freely rotative in a sleeve 52 screwed into the rotor head 21, and which is urged inward of the rotor by a spring 53. To the outer protruding end of the shaft 49 is affixed a wheel 55 with a beveled periphery in contact with the complementally beveled periphery of a similar wheel 56. From Fig. 7 it will be noted that the wheel 56 is slidably splined on the bearing boss 57 for the rotor shaft 2 on a supplementary portion 58 of the side frame 3 and maintained in frictional engagement with the wheel 55 by a spring 59. Therefore, as the rotor 1 revolves, the wheel 55 in rolling about the wheel 56, will tend to rotate the take-up reel 23 and thereby tension the strip S as will be readily understood from Fig. 6. Integrally formed with the wheel 55 is a brake drum 60 which is surrounded by a brake band 61 whereof one end is anchored on the rotor head 20 at 62. The other end of the brake band 61 is connected to short arm 63 at the outer end of a rock shaft 64 which extends through the rotor head 20. To the inner end of the shaft 64 is secured an arm 65 which, in conjunction with a coaxially fulcrumed arm 66 on the opposite rotor head 21, carries a roller 67 to run against the back of the strip S adjacent the take-up spool 23. The strip supply spool 22 is similarly removably mounted in the rotor with one end of its spindle 68 coupled with a short shaft 69 (Fig. 17) in the rotor head 20, and with its other end engaging a spring influenced bearing element 70 in the rotor head 21. To the outer end of shaft 69 is secured a drum 71 which is surrounded by a brake band 72 whereof one end is anchored at 73 on the rotor head 20, and the other end connected to a short arm 75 at the inner end of a rock shaft 76. An arm 77 at the outer end of shaft 76 is in turn connected by a link 78 to one end of a lever 79 fulcrumed at 80 on the rotor head 20. As shown in Fig. 17, the lever 79, and a coaxially fulcrumed lever 81 on the opposite rotor head 21, jointly support a roller 82 to bear against the back of the strip S adjacent the supply spool 22, see Fig. 6. By virtue of the construction just described, it will be apparent that the brake bands 61 and 72 are automatically contracted upon slacking of the strip S, and relieved when the strip becomes too tense. A compensative action thus takes place whereby the strip is maintained uniformally taut without imposition ordinarily of strains such as would cause rupture.

In its travel from the supply spool to the platen bar 25, the strip S traverses a perforating device 85 which is supported by the rotor between a suction tube 86 and a rod 87 extending crosswise of the rotor heads 20 and 21 adjacent their peripheries. As best seen in Fig. 25, the perforating device 85 comprises a pair of plates 88 and 89 spaced by an interval for passage of the strip S between them. Guided in the plate 88 is a punch plunger 90 which is adapted to move into a coaxial aperture 91 in the plate 89, to which latter a receiver 92 is removably secured to catch the punchings cut from the strip. The punch 90 is normally held retracted by spring 93 in compression between a head at its outer end and the plate 88, with said head contacting a tappet arm 95 on a rock shaft 96 extending crosswise of the rotor, said arm having a stop projection 97 which is normally engaged with one edge of said plate. The rock shaft 96 is actuated through engagement of a finger 98 at the outer end thereof with a stud 99 extending inward from the side frame 4, see Figs. 1, 4, 5, 7 and 13.

Figure 2:
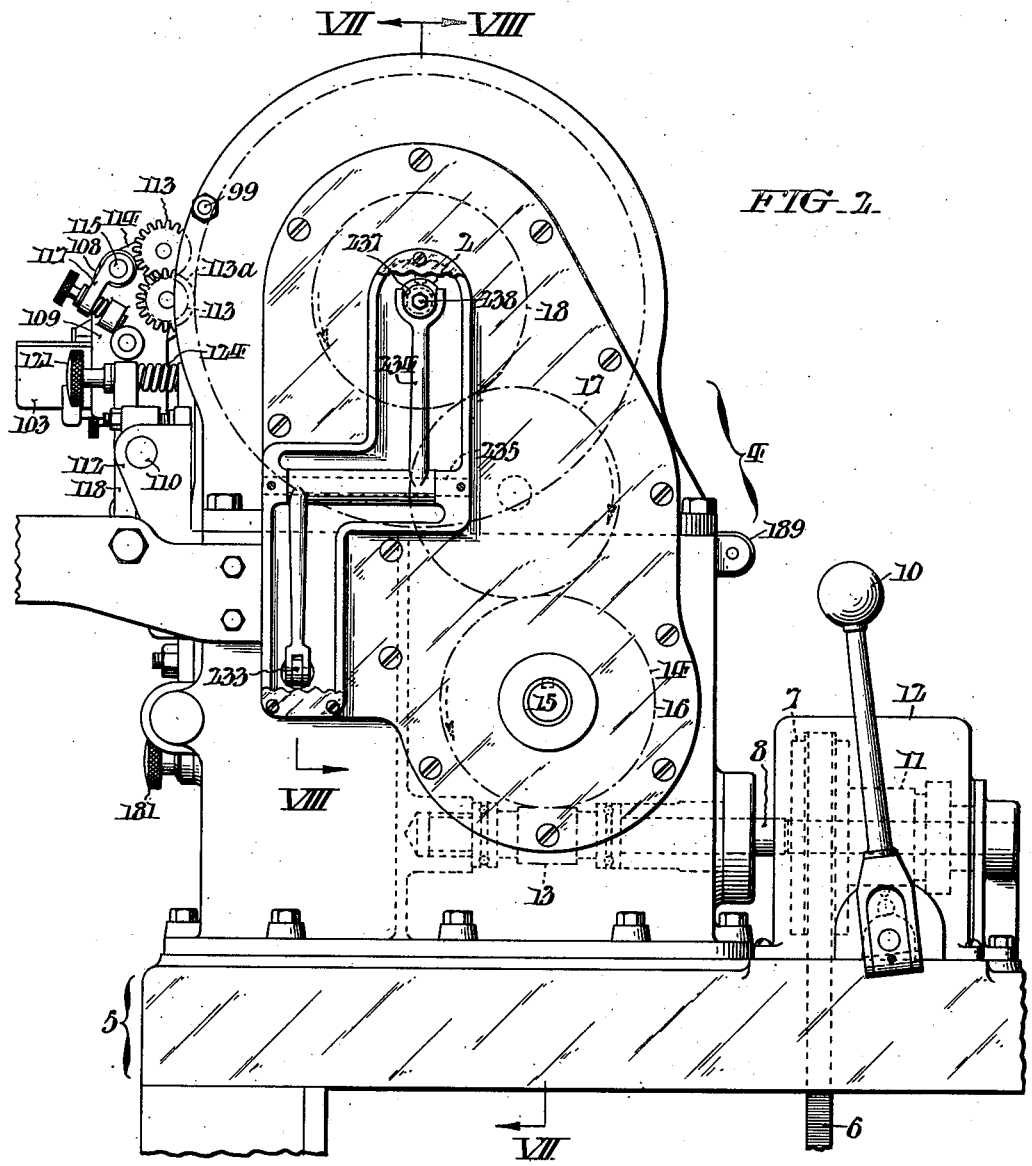
Fig. 2 shows the elevation of one side of the machine.
Figure 3:
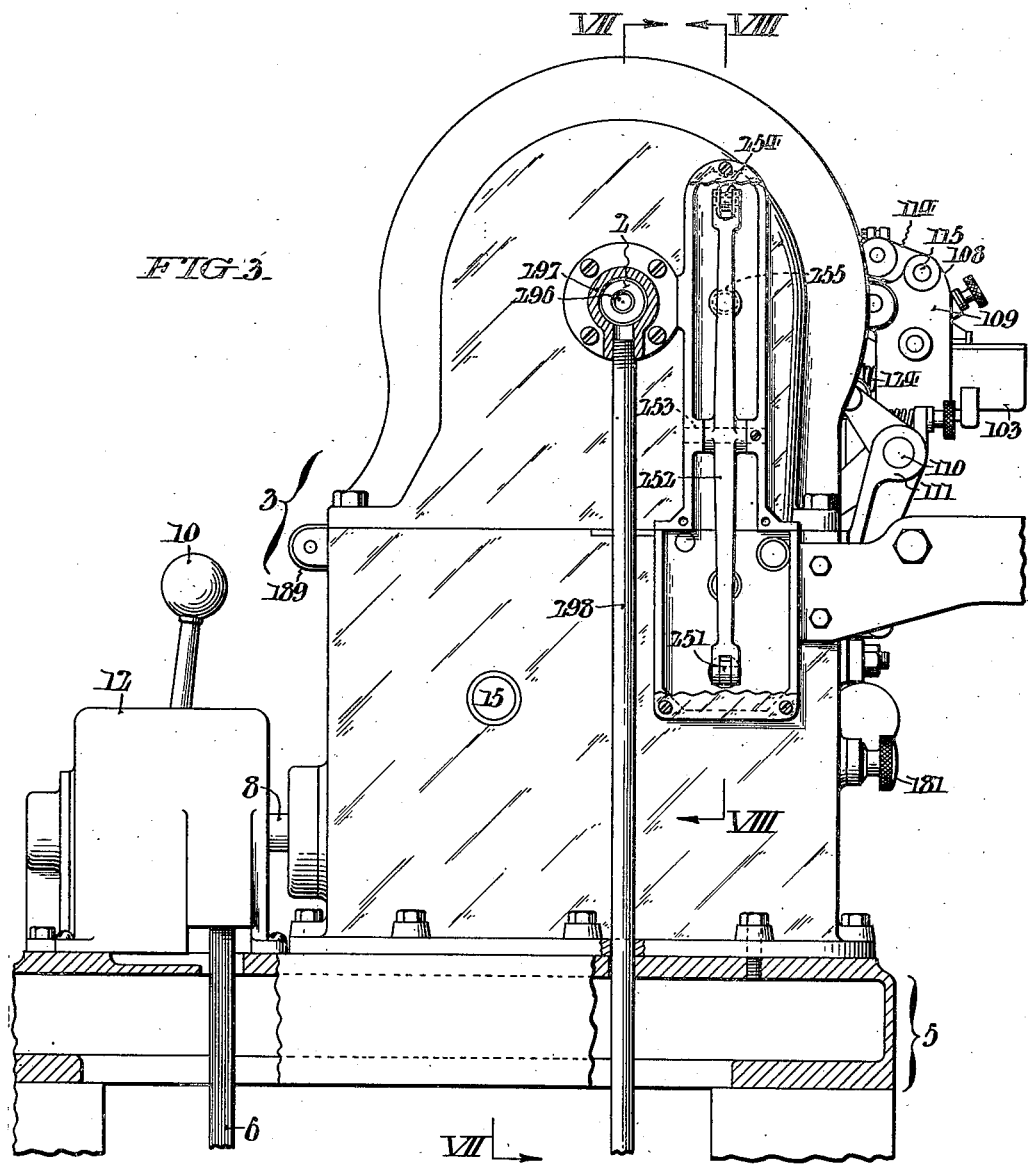
Fig. 3 shows the elevation of the other side of the machine.

During each revolution of the rotor 1, the exposed area of the strip S overlying the platen bar 25 is wetted by contact with the applicator roll 100 of a moistening device 101, the moistening liquid being conducted to said roll by a contacting roll 102 which is partially submerged in a well 103 containing the liquid supply. The moisture thus supplied to the applicator roll 100 is evenly distributed over the surface of said roll by a doctor roll 104. Strips of belt or the like conventionally indicated at 105 wipe against the roll from opposite sides and across the ends and so prevent excess liquid from being carried up to the applicator roll 100. The shaft of applicator roll 100 is journalled in upward extremities 108 of a yoke element 109 which is affixed to a rock shaft 110 which extends transversely of the machine between upward and rearward projecting bearing brackets 111 and 112 bolted to the side frames 3 and 4. The shaft of the doctor roll 104 is coupled to the shaft of applicator roll 100 by a pair of spur gears 113 and borne in arms 114 on a cross shaft 115 which is journalled in the yoke extremities 108. The applicator roll 100 is driven by a second spur pinion 113a on its shaft in mesh with a gear ring 183 on the rotor 1, see Figs. 2 and 6. A screw adjustable-spring 116 acting upon an arm 117 on one end of shaft 115 is relied upon to keep the doctor roll 104 pressed against the applicator roll 100. Also secured to the rock shaft 110 is a short pendant arm 118 between which and the bracket 112 is interposed a spring 119 whereby the moistening device 101 is urged toward the rotor 1 as far as permitted by the adjustable stop pin indicated at 120. By means of a thumb screw 121, whereof the shank passes through a wing 122 on the yoke element 109 and threadedly engages into an upward projection 123 of arm 118, it is possible to adjust said element angularly on the shaft 110 relative to said arm against the resistance of a compression spring indicated at 124.

In addition to the other parts already described, the rotor 1 carries a device 125 (Figs. 1, 5 and 18) for counting and printing serial numbers upon data sheets or cards C successively fed into the machine as later on explained. This counting and printing device 125 is mounted on an arm 126 fulcrumed for adjustability about the rotor shaft bearing boss 57 on the side frame 4, said arm having a lateral projection 128 which over-reaches a concentric annular flange 129 at the inner side of the rotor head 20. The device 125 is securable in adjusted positions circumferentially of the rotor 1 by a clamp bolt 130 whereof the shank extends through the projection 128 and through a circumferential slot 131 in the flange 129, see Figs. 5 and 21. Angular adjustment of the arm 126 is effected through coordination of a pointer 132 on the projection 128 with scale graduations 133 on the outer side face of the rotor head 20 adjacent the periphery of the latter. The device 125 is also adjustable laterally of the projection 128 of arm 126 and securable in adjusted positions by means of screws selectively engageable in tapped apertures 136 of a series longitudinally of said projection. The actuating arm 137 of the device 125 has a roller 138 arranged to run on the edge of a cam 139 which normally occupies a recess formed by an annulus 140 affixed to the supplementary portion 58 of the side frame 3 of the machine in concentric relation to the rotor shaft 2. As shown, the cam 139 is secured to a block 141 having a pair of spaced studs 142 slidably engaged in guide holes in the parts 58 and 140 at the side frame 3 of the machine. Accordingly, during each revolution of the rotor, the numbering device 125 is operated by the cam 139 to present new serial number type which is wiped against an ink saturated roller 143 on an arm 144 secured to the rock shaft 110 previously mentioned.

The data sheets or cards C successively fed into the machine in a manner later on explained, are delivered by an endless belt 150 to a plate 151 which extends beneath the rotor 1. In traversing the plate 151, the sheets or cards are held down by the ends 152 of depressing fingers 153 affixed to the rock shaft 110 previously referred to, being at the same time engaged at opposite side edges by guides 154. A weighted roller 155, suspended on arms 156 freely fulcrumed on the arms 153 which support the fingers 152, cooperates with the belt 150 in advancing the sheets or cards to the rotor 1, said belt being trained about a pulley roll and being constantly driven by suitable means, not shown, from the main shaft 15 of the machine. As the sheets or cards C are fed into the machine they are momentarily arrested on the belt 150 by stop fingers 157 affixed to a rock shaft 158 in the mid part of the machine. As shown, tails 159 on the stops 157 engage adjustable studs 160 in the ends of arms 161 which are secured to another rock shaft 162 also in the mid-part of the machine, together with an arm 163 having a roller 164 running in contact with a rotary disk cam 165 on the shaft 15. Through a spring at 166 in Fig. 6 acting upon a tail projection 161a of lever 161, the roller 164 of the latter is yieldingly maintained in engagement with rotary cam 165. The rotation of the disk cam 165 is so timed with respect to the rotor 1 that the stop fingers 157 are withdrawn at the proper moment to release each sheet or card C for further advance in the machine by a pair of circumferentially grooved nip rolls 167, 168, to meet with the area of the strip S overlying the platen bar 25 of said rotor for reception of an imprint from such sheet or card immediately after said area has been moistened by contact with the applicator roll 100 of the moistening device 101. The shaft of the lower nip roll 167 is rotatively supported in bearings on the side frames of the machine; while the upper nip roll 168 is carried by a pair of arms 169 secured to the transverse rock shaft 162, so that it is lowered for action upon the sheets or cards C concurrently with retraction of the stop fingers 157. In the present instance, the arms 161, 161a, 163 and 169 are formed as integral projections of a sleeve or collar fast on the rock shaft 162. As each sheet or card C passes through the machine, it is pressed against the platen bar 25 of the rotor 1 by an underlying roll 170 whereof the shaft 171 is journalled at opposite ends in bearing blocks 172, see Fig. 22, engaged in vertical guide-ways 172a in the side frames 3 and 4 of the machine, said blocks being urged upwardly in said guide-ways toward the rotor by springs 173. Independently fulcrumed on the transverse shaft 162 are bell crank levers 176 and 177 whereof the horizontal arms are provided with studs 178 (see Fig. 22) to bear on the bearing blocks 172 from above. The longer pendant arms of these levers 176, 177 are connected to link rods 179 which pass through apertures in lugs 180 of the side frames 3 and 4. By means of thumb nuts 181 threadedly engaging the outer protruding ends of the link rods 179, the bell crank levers 176 and 177 can be accurately adjusted to position the press roll 170 in proper cooperative relation with the rotor 1. Affixed to one end of the shaft of press roll 170 is a driving spur pinion 182 which meshes with the spur gear ring 183 affixed to the outer side of one of the rotor heads 21, see Figs. 6, 7 and 9. Through a train of intermeshing spur pinions 185, 186, 187, the nip rolls 167, 168 are positively driven from the gear wheel 182 on the shaft 171 of press roll 170 as will also be seen from Fig. 9. As the sheets or cards C successively emerge from beneath the rotor onto another section 151a of supporting plate 151 (Fig. 6), they are engaged between an endless delivery belt 189 and a cooperative weight roll 190 and discharged from the machine for reception by a stacking apparatus, such for example as disclosed in my co-pending application Serial Number 47,834 filed September 4, 1948, which has matured into Patent No. 2,595,346 granted May 6, 1952. The shaft of roll 190 is rotatively supported in fixed bearings 191 and the belt trained about pulley rolls 192, 193 of which the former lies directly below said roll 190. The shaft of the pulley roll 192 is journalled at opposite ends in bearing blocks 195 which occupy vertical guide-ways 196 in the side frames and which are urged upwardly by springs 197. As will be seen from Fig. 9, the shafts of the rolls 190, 192 are positively driven through a train of intermeshing spur pinions 198, 199 and 200 from the gear wheel 182 shaft 171 of the press roll 170. The belt 189 is tensioned by idler rolls 201 which are adapted to engage its lower run from above and below, said rolls being carried by a disk 202 on a shaft 203 with bearing in the side frame 3. The disk 202 is rotatively adjustable, by means of finger jamb nut 204, to regulate the tension of the belt 189 through the idlers 201 as may be required. As the sheets or cards C overtravel the belt 189, their opposite side edges pass beneath fixed supplemental guides 154a, while a weight roller indicated at 206 acts as a hold down means.

In order to prevent shifting of the strip S and actuation of the serial number printing and counting device 125 and to retract the tape moistening means 101 in the absence of a data sheet or card in the machine, I have provided mechanism including a feeler or detector element in the form of a finger 210 (Figs. 4, 6, 8, 24 and 26–29), which is normally depressed by said sheets or cards as they pass through the machine. As shown, this detector element 210 pivots on a fixed stud 211 in an upstanding projection 212 on the block 213 with its free end extending into one of the grooves of the card advancing roll 167, and has a tail with an upward cam projection 215. A spring influenced pin 216 acts upon the tail of the finger 210 and tends to turn the latter counterclockwise until arrested by a stop 217 as in Fig. 26. Mounted on the main shaft 15 is a disk cam 218 (Fig. 27) which acts upon the roller 219 at the end of a vertical arm 220 connected, by a horizontal link rod 221, to an arm 122 which is disposed in a recess 223 in the block 213 and which depends from a rock shaft 224 extending crosswise of said recess. An upwardly extending arm 225 also affixed to the shaft 224 has a laterally extending pin 226 at its free end to cooperate with the cam projection 215 on the tail of the detector finger 210. By action of a spring 227 upon the link rod 221, the roller 219 on arm 220 is yieldingly maintained in engagement with the cam 218. With a data sheet or card C present in the machine and depressing the detector finger 210, the arm 225 will move idly back and forth without affecting said finger as will be readily understood from Fig. 27. Constrained to endwise movement in transverse slots 230 in spaced projections 231 at the inner side of the block 213, is a normally quiescent bar 232. One end of this bar 232 is connected, by means of a link 233 (Fig. 24), to the lower end of a vertical lever 234 medially pivoted at 235 on the side frame 4, the upper end of said lever being provided with a stud 236 which engages the circumferential groove of a collar 237 at the outer end of a rod 238 disposed in an axial bore 239 in one end of the rotor shaft 2. A crosswise pin 240 in an enlargement 241 of the rod 238 extends through a longitudinal slot 239 in the rotor shaft 2 to engage the hub of the cam disk 242 which is slidably mounted on said shaft. A coil spring 243 in compression between the enlargement 241 of rod 238 and a sleeve 245 closing the bore 239 of shaft 2 at its outer end, tends to maintain the cam 242 normally in the position in which it is shown in Figs. 7, 11 and 24, out of the path of a roller 246 on a slide 247 confined to endwise movement in a guide-way 248 in the side frame 4 behind the plate 33. From Figs. 10, 11, 13–16 it will be noted that the slide 247 is diametrically disposed with respect to the plate 33, and that it has a slot 247a to clear the rotor shaft 2. As further shown, the slide 247 carries the cam piece 34 and the tooth 35 by the aid of which the disk 29 is intermittently rotated as hereinbefore explained. A pair of springs 249 are relied upon to keep the slide 247 normally positioned as in Figs. 10, 11, 13–16. However, when the cam 242 is shifted into the path of the roller 246, the slide is moved against the action of the springs 249, with attendant withdrawal of the cam piece 34 into a recess indicated at 250 so that the curved outer surface of said cam piece coincides with the periphery of the plate 33 as in Fig. 16. When this occurs a contiguous pair of the studs 31 on the disk 29 will simply override the cam piece 34 without inducing rotation of said disk or the strip feed rolls 26 and 27. A link 251 connects the opposite end of the slide bar 232 with the lower end of another vertical lever 252 which is medially pivoted at 253 on the side frame 3. The upper end of lever 252 is in turn connected, by a horizontal link 254, with the cam 139 which operates the number printing and counting device 125, and which is normally positioned as in Figs. 5, 18, 19 and 24 and so held by a spring 255 influencing said lever. As shown in Figs. 18 and 24 the link 254 passes through a clearance opening 256 in the annulus 140 on the side frame 3.

Similarly constrained to endwise movement in other horizontal guide-ways 230 in the projections 231 of block 213 immediately below the bar 232 is a second bar 257 having a pendant stud projection 258 connected, by a link 259, to one end of a horizontal lever 260 which is medially pivoted on a bracket projection 261 of said block 213. The other end of the lever 260 carries a roller 262 in engagement with a circumferentially grooved rotary cam 263 on the transmission shaft 15. As a consequence of this arrangement, the bar 257 is constantly reciprocated when the machine is in operation. Centrally of its top, the bar 257 has a notch 266 which is adapted to be engaged, as later explained, by the lower end of a dog 267 capable of up and down movement in a vertical slot 231a in the bar 232, and which is recessed at its upper end as at 268 for capacity to be engaged by the lateral projection 269 of a latch element 270 pivoted at 271 on the block 213. A spring 272 tends to urge the dog 267 downward, while a spring influenced pin 273 tends to urge the latch element 270 toward said dog. Each time that the bar 257 moves to the right in Fig. 29, a cam piece 274 thereon engages a roller 275 on the dog to lift the latter and prevent it from being caught in the notch 266 of said bar. At the same time, a projection 276 carried by the bar 257 (Fig. 24) swings the latch 269 aside. In the absence of a data sheet or card C in the machine with the detector finger 210 positioned as in Figs. 24, 26 and 29, the tail of said finger will intercept the latch element 270 and thereby hold it away from the dog 267. Under this condition, the dog 267 will be depressed by its spring 272 and slip into the notch 266 of bar 257. As a consequence, the bar 232 will be carried along with the bar 257 and, through the intermediate connections above described, cause the cams 34 and 139 to be shifted and thereby prevent actuation of the strip progressing means and the number printing and counting device.

To the left hand end of the slide bar 232 (Fig. 29) is connected one end of a lever 280 (Figs. 26 and 28) which is medially fulcrumed at 281. Rollers 282 at the opposite end of lever 280 bear against the inner face of the disk cam 283 which is slidably keyed on the transmission shaft 15. The disk cam 283 is subject to a spring 285, so that when the lever 280 is moved by the bar 232, said cam will be shifted into the path of a roller 286 on a vertical arm 287 which is fulcrumed at 288 on the machine base 5, and which is connected, by a horizontal link 289, to a pendant arm 290 on the rockable support 109 of the moistening device 101. Therefore in the absence of a data sheet or card C in the machine, the moistening device 101 will be retracted to prevent contact of its applicator roll 100 with the exposed area of the strip S on the platen bar 25 of the rotor 1 at the same time that the strip feeding and the counting and printing device are idled.

The perforated tube 86 hereinbefore mentioned communicates, by way of radially arranged pipe 295, with an axial bore 296 in the right hand end (Fig. 7) of the rotor shaft 2. The open end of the bore 296 is covered by a cap 297 affixed to the side frame 3, and extending downward from this cap is a pipe 298.

Figure 32:
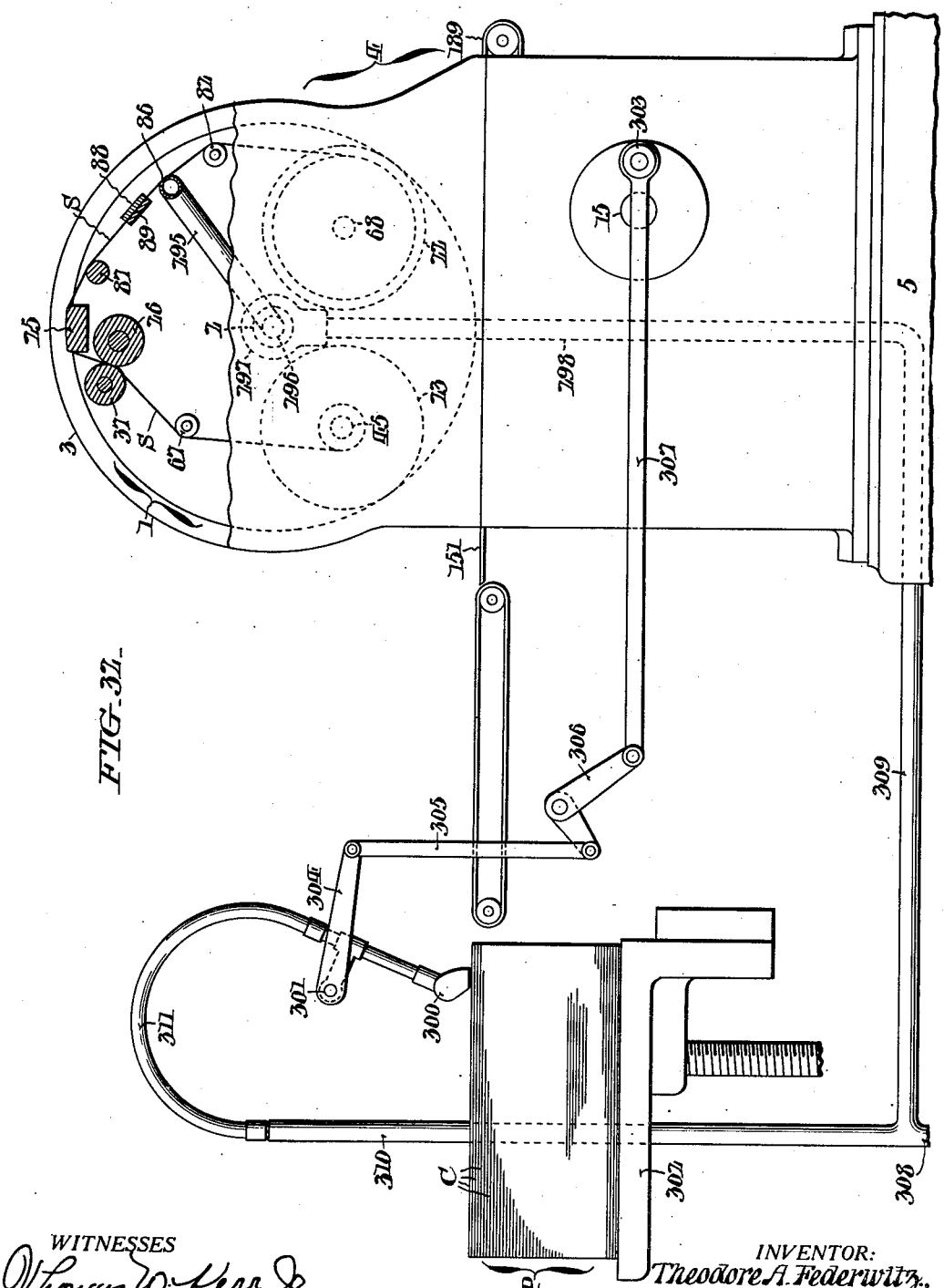
Fig. 32 shows the machine in side elevation with inclusion of the means by which the data sheets or cards are successively fed thereinto.
Figure 28:
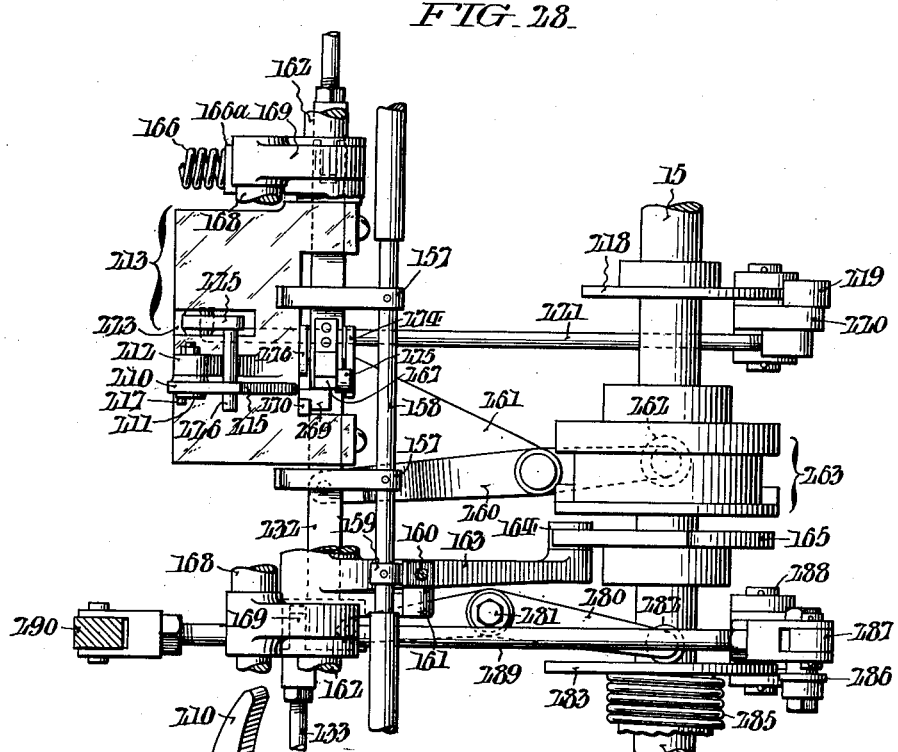
Fig. 28 is a fragmentary view showing the control mechanism in top plan.
Figure 29:
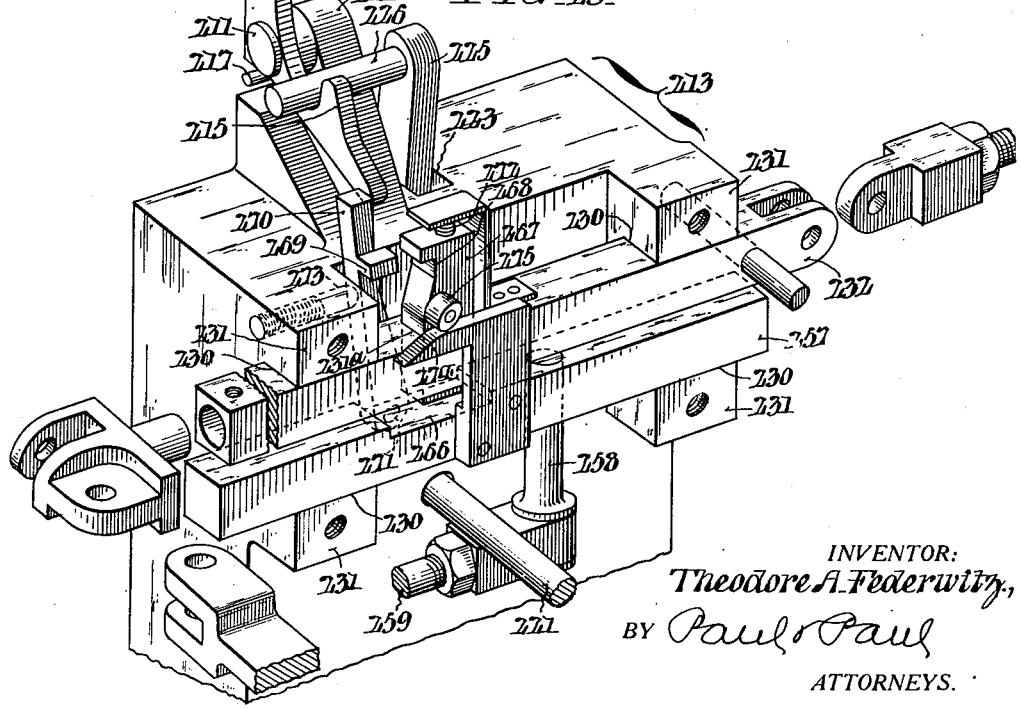
Fig. 29 is a perspective view of one of the constituent parts in the control mechanism.

For the purpose of feeding the data sheets or cards C to the machine, there is illustrated in Fig. 32, a suction finger which is swingable about a fixed center 301, and which, in its operation, removes individual sheets or cards from the top of a pile P on a table 302. By suitable mechanism, not shown, the table 302 is gradually raised as the sheets or cards are removed so that the top of the pile P is maintained at a substantially constant level. The suction finger 300 is actuated from a crank 303 on the main shaft 15 of the machine with the result that a data sheet or card is fed into the machine at each revolution of the rotor 1. Leading from a suitable source of suction (not shown) is a conduit 308 with branches 309 and 310 whereof the former is connected to the pipe 298 which is in communication with the perforated tube 86 on the rotor, and whereof the latter is connected by a flexible hose 311 to the feed finger 300. Due to this arrangement, it will be apparent that, in the event of rupture of the strip S, the apertures in the tube 86 will be exposed, with consequent breaking of the vacuum at the feed finger 300 and interruption in the feeding of the data sheets or cards from the pile C into the machine.

*Operation*

Figure 31:
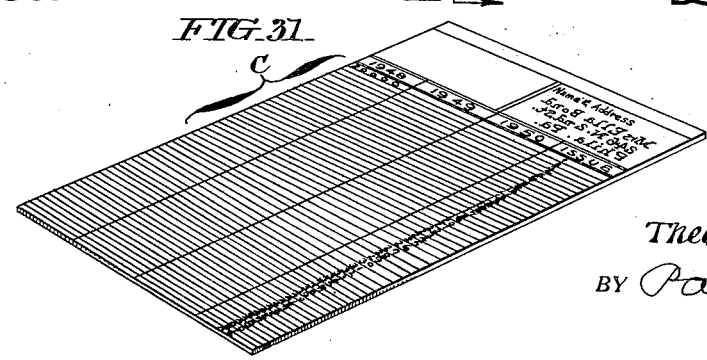
Fig. 31 shows one of the data sheets or cards with a serial number printed thereon after its passage through the machine.

Let it be assumed by way of example that the data sheets or cards bear reversely printed or typed addresses (as instanced in Fig. 31) of subscribers to a magazine or newspaper, that this data is to be transferred to successive areas of the strip S, and that these areas are to be subsequently cut apart into separate labels and pasted or otherwise attached to the magazines or newspapers either manually, or by a suitable auxiliary apparatus designed for that purpose. As a data sheet or card is introduced into the machine, it is momentarily arrested by contact of its front edge with the stop elements 157 until the platen bar 25 arrives at a certain point in the revolution of the rotor 1 to predetermine eventual registry of the address inscription thereof centrally with the then exposed area of the strip S as the sheet or card passes between the rotor and the press roll 170.

Up until the time that the data sheet or card reaches the stops 157, the detector 210 is held depressed out of the way by action of the cam 218, as in Fig. 27, to preclude nicking of the front edge of the sheet or card. However, just before the stop elements 157 are retracted, the detector 210 is released to the action of the spring pin 216 upon movement of the stud 226 away from the hump 215 as the high portion of the cam 218 arrives at the roller 219 on arm 220, and is thereafter held depressed by the sheet or card in further travel of the latter in the machine. Before meeting with the data sheet or card at the press point, the exposed area of the strip S then overlying the platen bar 25 of the rotor is contacted by the applicator roll 100 of the moistening device 101, the number printing and counting device 125 tripped and the newly presented serial number thereof inked, and the punch device 85 actuated to puncture the strip. Thus, as the data sheet or card traverses the press point, a serial number is imprinted upon it, and an impression of the data imparted therefrom to the area of the strip at that time exposed at the platen bar 25 of the rotor. The machine functions in this way as long as data sheets or cards are continuously fed into it. After a batch of the cards has been run through the machine, the loaded strip take-up spool 23 is removed to an auxiliary apparatus or machine by which the printed areas are separated from the strip by crosswise cutting, see Fig. 30, and the labels thus formed applied to the individual magazines or newspapers. On the other hand if the printed areas are manually cut from the strip, the punch holes (Fig. 30) are intended to serve as guides in the cutting. Upon interruption in the feeding, or in the absence of a card in the machine at any time, the detector element 210 will be released as already explained, with attendant retraction of the latch 270 (Fig. 29) from the dog 267 and dropping of the latter into the recess 266 in the constantly reciprocated bar 257. The bar 232 is thereby coupled to and moved by the bar 257 with a result that, through the interposed connections hereinbefore described, the cam 242 is shifted to the broken line position in Fig. 11 to act upon the slide 247 for withdrawal of the cam piece 34 into the confines of the plate 33 to prevent actuation of the strip progressing feed rolls 26, 27, the cam 139 shifted to the inactive position in which it is shown in dotted lines in Fig. 19 to prevent actuation of the number printing and counting device 125, and the moistening device 101 withdrawn as shown in Fig. 26 to prevent contact of its applicator roll 100 with the exposed area of the strip S then overlying the platen bar 25 of the rotor 1. It will therefore be apparent that an accurate account of the data transfers from the data sheets or cards to the strip S will be registered by the counting device 125 and said sheets or cards serially numbered in the proper order without the possibility of skips.

In the event of rupture of the strip S and exposure of the apertures in the tube 86 (Figs. 6 and 25) of the rotor, the vacuum in the feed finger 300 (Fig. 32) will be broken with consequent interruption in the feeding of data sheets or cards into the machine. When the latter contingency occurs, the machine will cease to function by reason of absence therein of the sheets or cards as above explained.

The herein described use of my improved machine is of course to be regarded as exemplary of many others to which it may be put as will be readily understood by those familiar with the art.

Having thus described my invention, I claim:

1. In a data writing machine, a rotor with a segmental platen surface extending crosswise thereof; supply and take-up spools for a continuous strip of paper or the like carried by the rotor, with the strip passed over the platen surface; a pair of nip rolls on the rotor; means for intermittently turning the rolls to progress the strip for presentation of a new area thereof at the platen during each revolution of the rotor and for locking the rolls against turning after each actuation; means for driving the take-up reel to draw the tape including a pair of frictionally-engaging wheels, one secured to the shaft of the take-up reel and the other held against rotation in coaxial relation to the rotor; brake means for the supply and take-up reels; means contacting the back of the strip in the intervals between the platen bar and the supply and take-up reels to compensatively actuate the brake means for maintenance of a uniform tension on the strip; and means for conveying master sheets or cards successively through the machine for impression of data inscriptions therefrom onto the successively exposed strip areas presented at the platen surface.

2. A data writing machine according to claim 1, wherein the take-up reel driving wheels have oppositely beveled contacting peripheries; and wherein one of said wheels is spring pressed axially toward the other wheel.

3. In a data writing machine, a rotor with a segmental platen surface extending crosswise thereof; supply and take-up spools for a continuous strip of paper or the like carried by the rotor, with the strip passed over the platen surface enroute from the supply spool to the take-up spool; means operative to intermittently progress the strip for presentation of a new area thereof at the platen surface during each revolution of the rotor; a wheel on the axis of the take-up spool in frictional engagement with a wheel on the rotor axis for turning said spool; brake drums on the axes of the respective spools; brake bands surrounding the respective drums each having one of its ends anchored on the rotor; and means for automatically contracting the brake bands compensatively for maintenance of a strip under a predetermined uniform tension, including actuating arms whereto the opposite ends of the bands are respectively connected, said arms being independently fulcrumed on the rotor and having rollers running in contact with the tape respectively in the intervals between the platen surface of the rotor and the supply and take-up spools; and means for conveying master sheets or cards successively through the machine for impression of data inscriptions thereon upon the successively exposed strip areas overlying the platen surface.

4. In a data writing machine, a rotor with a segmental platen surface extending crosswise thereof; supply and take-up means for a continuous strip of paper or the like carried by the rotor with the strip passed over the platen surface; a pair of nip rolls; a cam operative to turn the rolls and thereby progress the strip for presentation of a new area thereof at the platen surface during each revolution of the rotor; a movably supported device with an applicator for applying moisture to the exposed areas of the strip overlying the platen surface during each revolution of the rotor; means for conveying master sheets or cards with soluble data inscriptions thereon successively through the machine for impression of the data upon the successively exposed moistened areas of the strip overlying the platen surface; and control mechanism including a detector automatically operated in the absence of a master sheet or card in the machine, and means actuated by the detector for withdrawing the cam aforesaid to prevent operation of the strip progressing means and for retracting the moistening device to prevent contact of its applicator with the exposed strip area then overlying the platen surface.

5. A data writing machine according to claim 4, wherein the control mechanism includes a detector element normally restrained by the master sheets or cards as they pass through the machine, and interposed means operated upon release of the detector element in the absence of the sheets or cards in the machine to retract the moistening device.

6. A data writing machine according to claim 4, wherein the moistening device is pivotally supported; and wherein the control means comprises a constantly rotating cam normally out of the range of said arm, a detector element normally restrained by the master sheets or cards as they pass through the machine, and interposed connections operated upon release of the detector element in the absence of the master sheets or cards in the machine, to shift the cam into the plane of an arm connected to the moistening device so that the latter is retractively swung on its pivot to prevent moistening of the exposed strip area then overlying the platen surface of the rotor.

7. In a data writing machine, a rotor with a segmental platen surface extending crosswise thereof; supply and take-up spools for a continuous strip of paper or the like carried by the rotor with the strip passed over the platen surface; means for intermittently progressing the strip to present a new area thereof over the platen surface at each revolution of the rotor; a suction feeder operative to remove individual cards or sheets having data inscriptions thereon from a pile and deliver them successively into the machine for transfer of the data from them to the successively exposed strip areas overlying the platen surface; a tube extending transversely of the rotor having a series of perforations normally covered by the strip as it travels between the supply and take-up spools; and conduit means connecting the suction feeder to the tube and to a suction source whereby, in the event of rupture of the strip, suction to the feeder is broken to prevent further delivery of the master cards to the rotor.

8. In a data writing machine, a rotor with a segmental platen surface extending crosswise thereof; supply and take-up spools for a continuous strip of paper or the like carried by the rotor, with the strip passed over the platen surface enroute from the supply spool to the take-up spool; means for intermittently progressing the strip for presentation of a new area thereof at the platen during each revolution of the rotor; a constantly moving belt for advancing successively fed data sheets beneath the rotor for impression of data inscriptions thereon upon the successively exposed strip areas overlying the platen surface of the rotor; a retractable stop element adapted to be contacted by the front edge of each data sheet or card to momentarily arrest the latter while on the belt; means for retracting the stop element when the platen surface has reached a definite point in the revolution of the rotor to predetermine ultimate registry thereof with the data inscription on such sheet or card at the time of pressing; and control mechanism automatically operative in the absence of a data sheet or card in the machine to prevent actuation of the strip progressing means, including a detector element in the form of a finger located in advance of the stop means and adapted to engage each data sheet or card from beneath, and means for holding the detector finger depressed from the path of the data sheet or card until the latter is arrested by said stop means.

9. In a data writing machine, a rotor with a segmental platen surface; supply and take-up means for a continuous strip of paper or the like carried by the rotor, with the strip passed over the platen surface; means operative to intermittently progress the strip for presentation of a new area thereof at the platen surface during each revolution of the rotor; means for conveying master sheets through the machine for transfer of data therefrom to the strip areas successively presented at the platen; a device also carried by the rotor for printing serial numbers upon the data sheets and counting them as they pass through the machine, said device having an actuating projection; a cam normally in the path of the actuating projection to cooperate with it in actuating the printing device during each rotation of the rotor; and control mechanism including a detector element normally restrained by the cards or sheets as they pass through the machine, and means responsive to the release of the detector element in the absence of a card or sheet in the machine, for withdrawing the cam from the path of the actuating projection of the number printing and counting device.

10. In a data writing machine, a rotor with a segmental platen surface; supply and take-up means for a continuous strip of paper or the like carried by the rotor, with the strip passed over the platen surface; means operative to intermittently progress the strip for presentation of a new area thereof at the platen surface at each revolution of the rotor, including a pair of intergeared nip rolls, a disk on the shaft of one of the rolls, and a cam operative during each revolution of the rotor to turn the disk and thereby induce rotation of the nip rolls for advance of the strip; means for conveying master sheets or cards successively through the machine for transfer of data therefrom to the strip areas successively presented at the platen surface of the rotor; and control mechanism including a detector element in the path of the data cards or sheets and normally restrained by them, and means responsive to the release of the detector element for withdrawing the cam from the path of the actuating projection in the absence of a data card or sheet in the machine to prevent operation of the strip progressing means.

11. In a data writing machine, a rotor with a segmental platen surface; supply and take-up means for a continuous strip of paper or the like carried by the rotor, with the strip passed over the platen surface; means operative to intermittently progress the strip for presentation of a new area thereof at the platen surface at each revolution of the rotor, including a pair of intergeared nip rolls, a disk on the shaft of one of the rolls having an annular series of laterally projecting studs, a stationary circular element concentric with the rotor axis having a cam depression in its periphery, and a shiftable cam piece normally overlying the cam depression to form therewith a cam groove for traverse by one of the studs on the disk to turn the latter during each rotation of the rotor and thereby rotate the nip rolls to progress the strip; means for conveying master cards or sheets successively through the machine for transfer of data therefrom to the strip areas successively presented at the platen surface of the rotor; and control mechanism including a detector element normally in the path of the data cards or sheets and normally restrained by them, and means responsive to the release of the detector element for withdrawing the cam piece in the absence of a data card or sheet in the machine to prevent operation of the strip progressing means.

12. In a data writing machine, a rotor with a segmental platen surface; supply and take-up means for a continuous strip of paper or the like carried by the rotor with the strip passed over the platen surface; means operative to intermittently progress the strip for presentation of a new area thereof at the platen surface during each revolution of the rotor; a movably supported device with an applicator for applying moisture to the exposed areas of the strip overlying the platen surface during each revolution of the rotor; means for conveying master sheets or cards with soluble data inscriptions thereon successively through the machine for transfer of data to the successively exposed moistened areas of the strip overlying the platen surface; and control mechanism including a detector element normally restrained by the master cards or sheets as they pass through the machine, and means responsive to the release of the detector element in the absence of cards or sheets in the machine, to retract the moistening device and so prevent contact of its applicator with the exposed strip area then overlying the platen surface.

13. In a data writing machine, a rotor with a segmental platen surface; supply and take-up means for a continuous strip of paper or the like carried by the rotor with the strip passed over the platen surface; means operative to intermittently progress the strip for presentation of a new area thereof at the platen surface at each revolution of the rotor; a pivotally supported device with an applicator for applying moisture to the exposed areas of the strip overlying the platen surface at each revolution of the rotor; means for conveying master sheets or cards with soluble data inscriptions thereon successively through the machine for transfer of the data to the successively exposed moistened areas of the strip overlying the platen surface; and control mechanism including a constantly rotating cam, a detector element normally restrained by the master cards or sheets as they pass through the machine, and means responsive to the release of the detector element in the absence of master cards or sheets in the machine, for shifting the cam into the plane of an arm connected to the moistening device so that the latter is retractively swung on its pivot to prevent moistening of the exposed strip-area then overlying the platen surface of the rotor.

14. In a data writing machine, a rotor with a segmental platen surface extending crosswise thereof; supply and take-up means for a continuous strip of paper or the like carried by the rotor, with the strip passing over the platen surface; means operative to intermittently progress the strip for presentation of a new area thereof at the platen surface during each rotation of the rotor; a number printing and counting device mounted for bodily rotation with the rotor and having an operating projection; a stationary cam normally in the path of the operating projection for actuating the number printing and counting device during each rotation of the rotor; means for conveying master cards or sheets successively through the machine for impression of data inscriptions therefrom onto the successively exposed strip areas overlying the platen surface of the rotor, and for concurrently numbering of said sheets or cards by the number printing and counting device; a detector element normally restrained by the sheets or cards as they pass through the machine; and interposed means whereby, upon release of the detector element in absence of a data card or sheet in the machine, the aforesaid cam is withdrawn from the path of the operating projection of the number printing and counting device.

15. A data writing machine according to claim 14, wherein the number printing and counting device is mounted on the end of an arm capable of being adjusted about the axis of the rotor.

16. In a data writing machine, a rotor with a segmental platen surface extending crosswise thereof; supply and take-up means for a continuous strip of paper or the like carried by the rotor, with the strip passing over the platen surface; means operative to intermittently progress the strip for presentation of a new area thereof at the platen surface during each rotation of the rotor, including a pair of intergeared nip rolls, a disk on the shaft of one of the rolls, and a stationary cam means operative upon the disk during each rotation of the rotor to turn it and thereby induce rotation of the nip rolls to progress the strip; means for conveying master sheets or cards successively through the machine for impression of data inscriptions therefrom onto the successively exposed areas of the strip overlying the platen surface of the rotor; a detector element disposed in the path of the data cards or sheets and normally restrained by them; and interposed means for retracting the disk aforesaid upon release of the detector element in the absence of a data card or sheet in the machine.

17. In a data writing machine, a rotor with a segmental platen surface extending crosswise thereof; supply and take-up means for a continuous strip of paper or the like carried by the rotor, with the strip passing over the platen surface; means operative to intermittently progress the strip for presentation of a new area thereof at the platen surface during each rotation of the rotor, including a pair of inter-geared nip rolls, a disk on the shaft of one of the rolls, having an annularly-arranged series of laterally-projecting studs, a stationary circular element concentric with the rotor axis having a cam depression in its periphery, a shiftable cam piece normally overlying the cam depression to form with the latter, a cam proove adapted to be traversed by one of the studs of the disk to turn the latter during each rotation of the rotor and thereby cause the nip rolls to progress the strip; means for conveying master sheets or cards successively through the machine for impression of data inscriptions therefrom onto the successively exposed areas of the strip overlying the platen surface of the rotor; a detector element disposed in the path of the data sheets or cards so as to be normally restrained by the latter; and interposed means for retracting the cam piece to inoperative position in the absence of a data sheet or card in the machine.

THEODORE A. FEDERWITZ.

REFERENCES CITED

The following references are of record in the file of this patent:

UNITED STATES PATENTS

| Number | Name | Date |
|---|---|---|
| 259,789 | Anthony | June 20, 1882 |
| 1,274,831 | Woodward | Aug. 6, 1918 |
| 1,302,803 | Jenkins | May 6, 1919 |
| 1,551,276 | Wyrick | Aug. 25, 1925 |
| 2,067,289 | Ritzerfeld | Jan. 12, 1937 |
| 2,088,175 | Ritzerfeld | July 27, 1937 |
| 2,216,591 | Hudson | Oct. 1, 1940 |
| 2,398,832 | Jirousek | Apr. 23, 1946 |